(12) United States Patent
Satt et al.

(10) Patent No.: US 8,190,737 B2
(45) Date of Patent: May 29, 2012

(54) DEVICE, METHOD AND SYSTEM FOR DETECTING UNWANTED CONVERSATIONAL MEDIA SESSION

(75) Inventors: Aharon Satt, Haifa (IL); Amir Lev, Ein Vered (IL)

(73) Assignee: Commtouch Software Ltd., Netanya (IL)

(*) Notice: Subject to any disclaimer, the term of this patent is extended or adjusted under 35 U.S.C. 154(b) by 0 days.

(21) Appl. No.: 12/938,256

(22) Filed: Nov. 2, 2010

(65) Prior Publication Data

US 2011/0046949 A1 Feb. 24, 2011

Related U.S. Application Data

(62) Division of application No. 11/524,535, filed on Sep. 21, 2006, now Pat. No. 7,849,186.

(51) Int. Cl.
*G06F 13/00* (2006.01)
(52) U.S. Cl. ............... 709/224; 709/227; 709/250
(58) Field of Classification Search ......... 709/217, 709/219, 223, 224, 227, 228, 250
See application file for complete search history.

(56) References Cited

U.S. PATENT DOCUMENTS

| | | | |
|---|---|---|---|
| 6,389,111 B1* | 5/2002 | Hollier et al. | 379/28 |
| 6,870,807 B1 | 3/2005 | Chan et al. | |
| 7,664,231 B2* | 2/2010 | Schmidmer et al. | 379/1.02 |
| 2005/0101306 A1 | 5/2005 | Zabawskyj et al. | |
| 2005/0132060 A1 | 6/2005 | Mo et al. | |
| 2005/0141493 A1 | 6/2005 | Hardy et al. | |
| 2005/0171955 A1 | 8/2005 | Hull et al. | |
| 2005/0186974 A1 | 8/2005 | Cai | |
| 2005/0193429 A1 | 9/2005 | Demopoulos et al. | |
| 2005/0201363 A1 | 9/2005 | Gilchrist et al. | |
| 2005/0259667 A1 | 11/2005 | Vinokurov et al. | |
| 2005/0278620 A1 | 12/2005 | Baldwin et al. | |
| 2006/0026242 A1 | 2/2006 | Kuhlmann et al. | |
| 2006/0041622 A1 | 2/2006 | Qutub et al. | |
| 2007/0036342 A1 | 2/2007 | Boillot et al. | |
| 2007/0064617 A1 | 3/2007 | Reves | |

FOREIGN PATENT DOCUMENTS

| | | |
|---|---|---|
| GB | 2397139 | 7/2004 |
| KR | 20040043404 A | 5/2004 |
| WO | WO 2005/119993 A1 | 12/2005 |

* cited by examiner

*Primary Examiner* — Viet Vu
(74) *Attorney, Agent, or Firm* — Browdy and Neimark, PLLC

(57) ABSTRACT

Some embodiments of the invention relate to a method and a system for detecting unwanted conversational media session data. In accordance with one aspect of the invention, a method of detecting unwanted conversation media session data according to some embodiments of the invention may include calculating two or more progressive similarity scores each with respect to a different instant during a progress of a real-time conversational media session, wherein each of said scores is associated with a similarity between the conversational media session's media data that was available at the associated instant and a reference data item corresponding to media data of a previous conversational media session, and evaluating progressive similarity between the real-time conversational media session and the reference data item based upon the two or more progressive similarity scores.

13 Claims, 9 Drawing Sheets

DEVICE, METHOD AND SYSTEM FOR DETECTING UNWANTED CONVERSATIONAL MEDIA SESSION

The present application is a Division of U.S. application Ser. No. 11/524,535 filed Sep. 21, 2006 now U.S. Pat. No. 7,849,186, issued Dec. 7, 2010, the entirety of which is hereby incorporated by reference.

FIELD OF THE INVENTION

This invention relates to a device, a method and a system for detecting unwanted conversational media sessions and for enabling control over conversational media traffic.

BACKGROUND OF THE INVENTION

Real-time conversational media sessions, such as conversational telephony services, for example, are known in the art. Conversational media sessions provide bi-directional real-time transfer of motion video, voice, text and other data and various combinations thereof between users at two or more locations. Conversational media services are described, for example, by a variety of standards, such as the IETF's SIP (Session Initiation Protocol) family of standards, and the ITU-T H.323 family of standards. Contemporary conversational media services include for example, VoIP (Voice over IP) also referred to as IP-Telephony, video telephony, and real-time text telephony.

Conversational media services over packet switched networks, in particular IP (Internet Protocol) networks, present users and organizations with new challenges, including the need to handle unwanted sessions and unwanted data within sessions. Unwanted sessions can become an annoyance to users and organizations and may potentially compromise security, particularly when the user or the organization is subject to a bulk of unwanted sessions. Due to the low cost of generating a mass of unwanted calls (or sessions) over packet data networks (no payment per session duration or per communication line, dedicated and expensive hardware is not required), such unwanted sessions are expected to become widespread unless effective solutions are devised.

SUMMARY OF THE INVENTION

It is an object of some embodiments of the invention to provide a device, a method and a system for detecting unwanted conversational media sessions (hereinafter: "CMS"). It is an object of further embodiments of the invention to provide a device, a method and a system for enabling control over conversational media traffic.

Some embodiments of the invention relate to a system and a method of detecting unwanted conversational media sessions or unwanted conversational media session data. According to some aspects of the invention, a method of detecting unwanted conversational media sessions may include calculating two or more progressive similarity scores each with respect to a different instant during a progress of a real-time CMS, wherein each of the scores is associated with a similarity between the real-time CMS media data that is available at the associated instant and a reference data item corresponding to media data of a previous CMS, and evaluating progressive similarity between the real-time CMS and the reference data item based upon the two or more progressive similarity scores. According to further embodiments of the invention the progressive similarity scores may be calculated on-the-fly during the progress of the real-time CMS.

According to further embodiments of the invention, a progressive similarity criterion may be applied, such that progressive similarity is established when the two or more progressive similarity scores are in compliance with the progressive similarity criterion. According to further embodiments of the invention, the progressive similarity criterion may be sensitive to the amount of media data associated with a similarity score.

According to still further embodiments of the invention, the real-time CMS may be discontinued in case it is established that the progressive similarity between the real-time CMS and a reference data item is in compliance with the progressive similarity criterion. According to some embodiments of the invention, in case the progressive similarity between the real-time CMS and a reference data item does not comply with the progressive similarity criterion, the similarity evaluation process may be halted, in which case the real-time CMS and the reference data item may be determined to be dissimilar. However, in accordance with a further embodiments of the invention, in case the progressive similarity between the real-time CMS and a reference data item does not comply with the progressive similarity criterion, the similarity evaluation process may either be halted, for example, in case the real-time CMS and the reference data item are determined to be dissimilar, or the calculation of the progressive similarity scores may continue, and at least one additional progressive similarity score may be calculated for the real-time CMS and the reference data as more media data becomes available and the similarity evaluation may be repeated taking into consideration the additional progressive similarity score. According to some embodiments of the invention, in case the progressive similarity between the real-time CMS and a reference data item does not comply with the progressive similarity criterion, the decision whether to halt the progressive similarity evaluation or whether to continue and calculate an additional progressive similarity score may depend upon the current progressive similarity scores and a progressive similarity criterion.

According to further aspects of the invention, a method of detecting unwanted conversational media sessions may include obtaining a sequence of significant attributes directly from a bit-stream associated with a real-time CMS, and evaluating similarity between the sequence of significant attributes associated with the real-time CMS and a reference data item corresponding to a sequence of significant attributes of a bit-stream associated with a previous CMS. According to further embodiments of the invention, the significant attributes may include one or more of the following: gain parameters of adapted and/or fixed codebooks, spectral parameters coded as Line Spectral Pair.

According to further embodiments of the invention, the real-time CMS may be discontinued upon establishing that the similarity the between sequence of significant attributes associated with the real-time CMS and a reference data item is above a certain threshold. According to still further embodiments of the invention, a CMS traffic control rule may be generated based upon the similarity between the sequence of significant attributes associated with the real-time CMS and the reference data item for enabling CMS traffic control. The traffic control rule may be generated in case the similarity the between sequence of significant attributes associated with the real-time CMS and reference data item is above a certain threshold.

According to still further aspects of the invention, there is provided a system and a method of detecting unwanted conversational media sessions which includes utilizing a fake conversation client. According to some embodiments of the invention, the fake conversation client may be utilized in a manner to cause an originator of real-time CMS data to setup a real-time CMS with the fake conversation client. The media portion of the real-time CMS data may then be used to generate a reference data item. The reference data item may be published in a manner to enable a client in receipt of the reference data item to control incoming real-time CMS traffic based upon a similarity between the incoming real-time CMS traffic and the reference data item.

According to some embodiments of the invention, the fake conversation client may be utilized to interface the real-time CMS data to enable receipt thereof at the fake conversation client. According to further embodiments of the invention, the fake conversation client may be further adapted to generate synthetic CMS data intended for causing the originator of the real-time CMS to provide the fake conversation client with further real-time CMS data. According to yet further embodiments of the invention, generating synthetic CMS data may include invoking prerecorded CMS data in response to the incoming real-time CMS data.

According to further aspects of the invention, a method of detecting unwanted conversational media sessions may include providing a conversation proxy positioned between an originator of real-time CMS and a client in a manner to cause the originator to setup a real-time CMS intended for the client through the proxy. The real-time CMS's media data may be evaluated for similarity with a reference data item corresponding to media data associated with a previous CMS received at the conversation proxy, and the real-time CMS may be controlled in accordance with a similarity between the real-time CMS's media data and reference data item associated with media data of a previous CMS.

According to some embodiments of the invention, the conversation proxy may be configured to interface the real-time CMS data arriving from the originator and the real-time CMS data arriving from the client to enable setting up of the of the real-time CMS between the originator and the client through the proxy. According to further embodiments of the invention, the proxy may be adapted to establish the real-time CMS intended for the client between the originator and the conversation proxy using signaling data associated with the intended client, and to establish a real-time CMS between the conversation proxy and the client using signaling data associated with the originator, thereby enabling CMS data exchanges between the originator and the client through the proxy.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
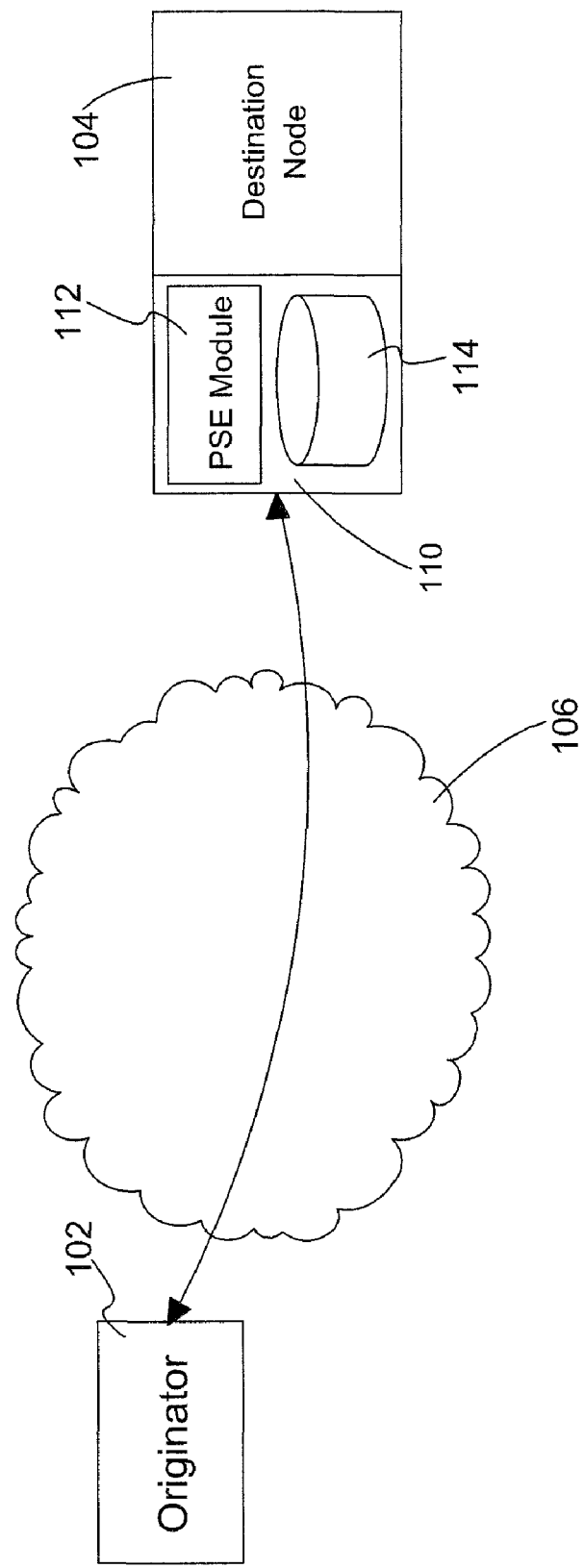
FIG. 1 is a block diagram illustration of a system for detecting unwanted conversational media sessions, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims reference is made to the term "session" either independently or as part of the term "conversational media session", which is sometimes abbreviated as "CMS". The term "session" shall be used to describe a series of interactions between two or more communication end nodes that occur during the span of a single connection. Typically, one end node known as "an originator" requests a connection with another specified end node known as "a recipient" or as "an intended recipient" and if the intended recipient replies, agreeing to the connection, the end nodes take turns exchanging commands and data ("talking to each other"). The session begins when the connection is established at both ends and terminates when the connection is ended. It should be appreciated that throughout the specification, unless specifically stated otherwise, any reference made to a "session" shall include a portion of a session.

Throughout the specification and the claims reference is made to the term "conversational media session" or in abbreviation "CMS". The term "conversational media session" or "CMS" shall be used to describe any bidirectional (or multi-directional) real-time session involving the exchange of media between two or more nodes over a network and/or a portion of such bidirectional real-time session involving the exchange of media between two or more nodes over a network. There are various types of real-time CMS which are known in the art. CMS types may differ from one another, for example, by the type of media which is supported by a particular CMS and/or by the underlying protocol used to enable the CMS traffic. Although throughout the specification specific examples of CMS protocols may be used, it would be appreciated that any reference to a particular type of CMS protocol is made by way of example and is not intended to limit the scope of the invention, unless specifically stated otherwise. Furthermore, it should be appreciated that embodiments of the present invention relate to any known in the present or yet to be devised in the future CMS.

Throughout the specification and the claims reference is made to the terms "media data", "CMS's media data" or the like. The terms "media data", "CMS's media data" or the like shall be used to describe any data which is or which is part of the media portion of a CMS and in particular the media portion of a real-time CMS. It would be appreciated by those of ordinary skill in the art that the media portion of a CMS, constitutes the CMS's content. Various types of CMS support different kinds of media. Examples include the IEFT's SIP (Session Initiation Protocol) family of standards, and the ITU-T's H.323 family of standards. Examples of media information or data include audio and video signals, typically supported by RTP (Real time protocol), a part of both families of standards mentioned above.

It would be appreciated that these examples, as well as any other example or reference to a specific CMS media type made throughout the description is made by way of example and is not intended to limit the scope of the invention, unless specifically stated otherwise. Furthermore, it should be appreciated that embodiments of the present invention relate to any known in the present or yet to be devised in the future CMS.

Throughout the specification and the claims reference is made to the term "signaling data" or the like. The term "signaling data" or the like is used to describe any data pertaining to a real-time CMS that is intended for setting up, enabling, supporting, augmenting and/or controlling a real-time CMS session but which does not include the actual content or media data of the real-time CMS. Signaling data as used herein may include but is not limited to real-time CMS data whose intended functionality is one or more of the following: session setup, session control and support, session resource allocation, session augmentation, session tear down, etc.

Some embodiments of the invention relate to a system and a method of detecting unwanted conversational media sessions and/or of detecting an unwanted portion within conversational media sessions. Reference is now made to FIG. 1, which is a block diagram illustration of a system for detecting unwanted conversational media sessions, according to some embodiments of the invention. In FIG. 1, there is illustrated a first network node 102 which is an originator of a real-time CMS and a second network node 104 which is an intended recipient of the real-time CMS. The originator 102 and the recipient 104 are operatively connectable to one another, for example, through a network 106. It would be appreciated, that although the terms "originator" and "recipient" are used throughout the specification and the claims to describe the participants of the real-time CMS, where the "originator" relates to the node which initiates the real-time CMS and the "recipient" is the intended destination of the originator's communication. However, it should be appreciated that during the real-time CMS data may be (but is not necessarily) exchanged in the reverse direction, from the recipient to the originator, or in both directions—from the originator to the recipient and vice-versa. Furthermore, it should be appreciated that a real-time CMS may involve more than two participants (or nodes) and data exchanges between the participants of the real-time CMS may also be multidirectional. Such real-time CMS traffic is sometimes referred to as a "conference call". Thus, it would be appreciated, that the real-time CMS setup shown in FIG. 1 provides merely an example of a possible real-time CMS setup.

A system for detecting unwanted CMS data 110, according to some embodiments of the invention, is also shown in FIG. 1. The system for detecting unwanted CMS data 110 may be associated with the intended recipient 104 of the real-time CMS, for example, the system 110 may be attached to the intended recipient 102 of the real-time CMS. The system for detecting unwanted CMS data 110 may include a progressive similarity evaluation module 112 (hereinafter: "PSE module"), and a reference database 114. The reference database 114 may include a plurality of reference data items. Each of the reference data items may be associated with a previous CMS or with a portion of a previous CMS. For example, data in respect of a previous CMS may be provided in various forms including, but not limited to, a recording of a previous CMS or of a portion of a previous CMS, a signature of a previous CMS (or of some portion thereof), a schematic representation providing progression schemes of one or more components of the previous CMS, etc. A previous CMS as used herein may include any earlier CMS traffic which traversed (and possibly is still traversing) the network and which was intercepted or otherwise obtained (and possibly is still being intercepted). The previous CMS used for generating the reference data items may be either randomly selected or may be selected in accordance with certain criteria. Thus, the reference data items are based upon actual CMS traffic, rather than being some sort of a simulation of CMS traffic. It would be appreciated, that according to further embodiments of the invention, the reference data items used in respect of a certain real-time CMS may be associated with specific previous CMSs, such as previous CMSs which were intended for the recipient of the current real-time CMS. However, according to further embodiments of the invention, the reference data items that are used in respect of certain real-time CMS may be associated with any previous CMS intercepted from the network, originating from any originator within the network and directed towards any recipient, and not necessarily with a CMS which was previously received or which was intended to be received at the intended recipient. Further details in respect of embodiments of the invention which relate to a system for detecting unwanted CMS data 110 which enables procurement of data in respect of previous CMSs which are not specifically associated with any particular originator and/or with any particular recipient or intended recipient shall be provided below.

The PSE module 112 may be adapted to implement a progressive similarity evaluation process. The progressive similarity evaluation process implemented by the PSE module 112 may be based upon calculating similarity measures during the progress of the real-time CMS, wherein each calculation is based upon the real-time CMS media data which has been thus far accumulated and corresponding reference data which is correlated with one or more previous CMSs. Some embodiments of the invention suggest a progressive similarity evaluation process which is based upon the assumption that authentic CMSs cannot be identical or substantially identical to one another, especially if a plurality of CMS are identified as being virtually identical, and that even if the sessions are subjected to artificial modifications to avoid identical sessions, the extent of the modifications is typically limited, particularly if a relatively large number of synthetic sessions are generated. It should be appreciated, the similarity evaluation modules described as part of some embodiments of the invention may be configured to monitor and to process real-time CMS traffic in one direction, the direction from the originator, and that communications in the other direction(s), such as from a recipient to the originator are not of interest to the similarity evaluation processes.

The similarity measure calculation may be an iterative process, such that during the progress or the real-time CMS at least two progressive similarity scores are calculated, each with respect to a different instant during the progress of the real-time CMS, and as the real-time CMS progresses more and more media data becomes available, each progressive similarity score is also associated with a different portion of the real-time CMS's media data. It would be appreciated, that real-time CMS traffic should not be significantly delayed, and that otherwise the flow of the conversation may be significantly compromised. On the other hand, in order to prevent or to reduce the harmful effects of unwanted CMS traffic, the unwanted CMS should be prevented if possible, or at least discontinued as soon as possible. The progressive similarity evaluation process suggested in accordance with some embodiments of the invention for detecting unwanted CMS traffic may offer a desirable tradeoff in the sense that it enables relatively fast and reliable detection of similarity between a real-time CMS and a previous CMS.

According to some embodiments of the invention, each progressive similarity score may be associated with the real-time CMS's media data that was accumulated from the start of the real-time CMS and up to the instant during the progress of the real-time CMS with which the progressive similarity score is associated. According to other embodiments of the invention, each progressive similarity score may be associated with the real-time CMS's media data that was accumulated since the last instant in respect of which a previous progressive similarity score was calculated. According to some embodiments of the invention, the progressive similarity evaluation process may proceed until enough data is accumulated to support a conclusion that the real-time CMS and one or more of the reference data items are similar. According to further embodiments of the invention, the duration of the progressive similarity evaluation process and/or the number of progressive similarity scores to be calculated may be predefined. According to still further embodiments of the invention, the duration of the progressive similarity evaluation process and/or the number of progressive similarity scores to be calculated may be dynamically determined based upon one or more of the following: the real-time CMS's media data flow rate (how much media data is received per time unit); and the level of similarity between the real-time CMS and the reference data items. In accordance with an optional embodiment of the invention, a first progressive similarity score is calculated in respect of a predefined instant during the progress of the real-time CMS, and based on the first progressive similarity score, the PSE module 112 may determine how many additional progressive similarity scores should be calculated and/or when is the next instant(s) in respect of which the next progressive similarity score(s) should be calculated and/or how much additional media data should be accumulated before the calculation of the next progressive similarity score(s).

According to some embodiments of the invention, a reference data item may include or may be generated based upon accumulated data in respect of a previous CMS or in respect of a portion of a previous CMS. In accordance with further embodiments of the invention, a reference data item may include a signature of a previous CMS. A signature of a previous CMS may be a compressed representation of the previous CMS. According to further embodiments of the invention, a signature of a previous CMS may include certain data which corresponds to one or more components, characteristics or parameters which are associated with of a previous CMS, and may either be compressed or not. For example, a reference data item may include a time ordered sequence of amplitude levels which correspond to the media data that originated from an originator of a previous CMS. The time ordered sequence of the amplitude levels may reflect the progression plot of a certain parameter of the media portion that originated from an originator of a previous CMS and may be used to determine the progressive similarity between a media portion being originated from an originator of a real-time CMS and the media portion that was originated by a previous originator as part of a previous CMS, as will be described in further detail below.

According to some embodiments of the invention, the PSE module 112 may be adapted to use the signaling data of a real-time CMS to pre-filter the reference data items so as to reduce the amount of reference data that needs to be processed as part of the progressive similarity evaluation process in respect of a certain real-time CMS. For example, as part of a progressive evaluation process implemented in respect of a certain real-time CMS, the PSE module 112 may be adapted to select from the reference database 114 only the reference data items that are associated with relatively recent CMSs. According to a further example, as part of a progressive evaluation process implemented in respect of a certain real-time CMS, the PSE module 112 may be adapted to select from the reference database 114 only the reference data items that are associated with CMSs having, for example, a common originator with the real-time CMS, or whose originator is located within the same domain as the originator of the real-time CMS. The reference database 114 may be implemented as a central database and may provide services to various PSE modules 112 distributed throughout the network, and each of the PSE modules 112 may be adapted to obtain from the central reference database 114 the reference data items that are pertinent to a certain real-time CMS being evaluated for progressive similarity by that PSE module 112.

As mentioned above, the PSE module 112 may be adapted to evaluate a progressive similarity between a real-time CMS and one or more reference data items. A progressive similarity between a real-time CMS and a reference data item may be determined based upon two or more progressive similarity scores. Each progressive similarity score may be based upon a measure of similarity between the real-time CMS data available at a certain instant during the progress of the real-time CMS and a reference data item or a portion of the reference data item. In accordance with some embodiments of the invention, progressive similarity score may be based upon a similarity between the real-time CMS data available at a certain instant during the progress of the real-time CMS and a portion of a reference data item which is correlated with a portion of a previous CMS, where that portion of the previous CMS is equivalent to the portion of the real-time CMS in respect of which the score is being calculated.

It should be appreciated that any presently known or yet to be devised in the future method, technique or mathematical model which is suitable for comparing two or more sets of values and for determining the similarity between the two sets of values may be used for calculating the progressive similarity scores. Each score calculated by the PSE module 112 is based upon a measure of similarity between media data of a real-time CMS that was available at an associated instant and a reference data item or a portion of a reference data item, where the reference data item provides data in respect of media data of a previous CMS. It should be further appreciated that according to some embodiments of the invention, the similarity measure technique implemented by the PSE module 112 for calculating progressive similarity may be substantially straightforward in terms of computational complexity, to enable fast calculation across large amount of reference data, while being insensitive to noise and certain modification (for example, to artificial modifications). For example, the similarity measure technique utilized by the PSE module 112 may provide various tolerance mechanisms so that insignificant alterations to the media data, such as, but not limited to alterations to background or non-significant areas of pictures or videos, are neutralized or are played down. Further details in respect of the relationship between the progressive similarity evaluation process and the progressive similarity scores shall be provided below.

According to some embodiments of the invention, as part of the progressive evaluation process, the PSE module 112 may select at least two instants during the progress of the media portion of the real-time CMS in respect of which a progressive similarity score is to be calculated. The PSE module 112 module may calculate a progressive similarity score in respect of each of the two or more instants that were selected by the PSE module 112. It would be appreciated that as the real-time CMS progresses, more and more media becomes available, and thus, as each progressive similarity score is calculated in respect of a different instant during the progress of the real-time CMS, each score may relate to different media data. According to some embodiments of the invention, each progressive similarity score may relate to the portion of a real-time CMS's media data that was received since the previous instant in respect of which a progressive similarity score was calculated. According to further embodiments of the invention, each progressive similarity score may relate to all the media data which has been accumulated from the start of the media portion of the real-time CMS and up to the instant in respect of which the score is calculated.

According to some embodiments of the invention, the two or more instants in respect of which the progressive similarity scores are to be calculated may be predefined. For example, the PSE module 112 may be adapted to calculate a progressive similarity score in respect of each 1 second period during the progress of the real-time CMS starting from the beginning of the media portion of the CMS. In accordance with another example, the PSE module 112 may be adapted to calculate a progressive similarity score in respect of each segment of 10 bytes of data made available as part of the progress of the real-time CMS. According to further embodiments of the invention, the PSE module 112 may be adapted to dynamically determine the next instant in respect of which the next progressive similarity score is to be calculated. The PSE module's 112 decision as to the next instant in respect of which a progressive similarity score is to be calculated may depend on various parameters, including but not limited to, the rate at which the real-time CMS data is being received, the quality of the data being received (how much significant information is received within a certain period of time), the previous progressive similarity scores and the number of previous progressive similarity scores calculated thus far, etc. For example, if the incoming real-time CMS data includes a lengthy "silence" period, the PSE module 112 may delay the calculation of the progressive similarity score until more "non-silence" data is received, so that the progressive similarity score is based not only on the "silence" period. According to still further embodiments of the invention, some of the instants during the progress of the real-time CMS in respect of which a progressive similarity score is to be calculated may be predefined whereas other instants for which progressive similarity scores may be determined by the PSE module 112 on-the-fly during the progress of the real-time CMS.

It should be further appreciated that, according to further embodiments of the invention, as part of calculating a progressive similarity score, a portion of the reference data item may be compared with a portion of the real-time CMS, rather than the entire reference data item being used. The PSE module 112 may be adapted to determine which portion of the reference data item is to be compared as part of each progressive similarity score calculation. According to some embodiments of the invention, the portion of the reference data item that is to be compared as part of calculating a certain progressive similarity score may correspond to the media data that was received from the beginning of the media portion of the previous CMS with which that reference data item is associated and up to the instant during the progress of the previous CMS with which that score is associated. However, according to further embodiments of the invention, the PSE module 112 may be adapted to select a different portion of the reference data item for calculating a progressive similarity score in respect of a certain instant during the progress of the real-time CMS, and that portion may not necessarily overlap with the instant during the progress of the real-time CMS. For example, as part of calculating a certain progressive similarity score, the PSE module 112 may be adapted to compare a certain portion of the media data of a real-time CMS that is associated with a certain instant with a portion of the reference data item which corresponds to a portion of a previous CMS that is associated with a different instant during the progress of the previous CMS.

According to some embodiments of the invention, as part of calculating a progressive similarity score, the PSE module 112 may be configured to compare the portion of media data of the real-time CMS that was available at the instant with which that score is associated with a reference data item or some portion thereof that is associated with media data of a previous CMS or with a segment of a previous CMS. According to further embodiments of the invention, comparing the current real-time CMS with a reference data item may include comparing only certain components or characteristics of the current and previous session(s), such as, for example, but not limited to acoustic frequency variation over time, amplitude of acoustic signals over time, comparing parameters calculated via parametric modeling of the signals, comparing frequency-domain representations of the signals, etc.

Figure 2:
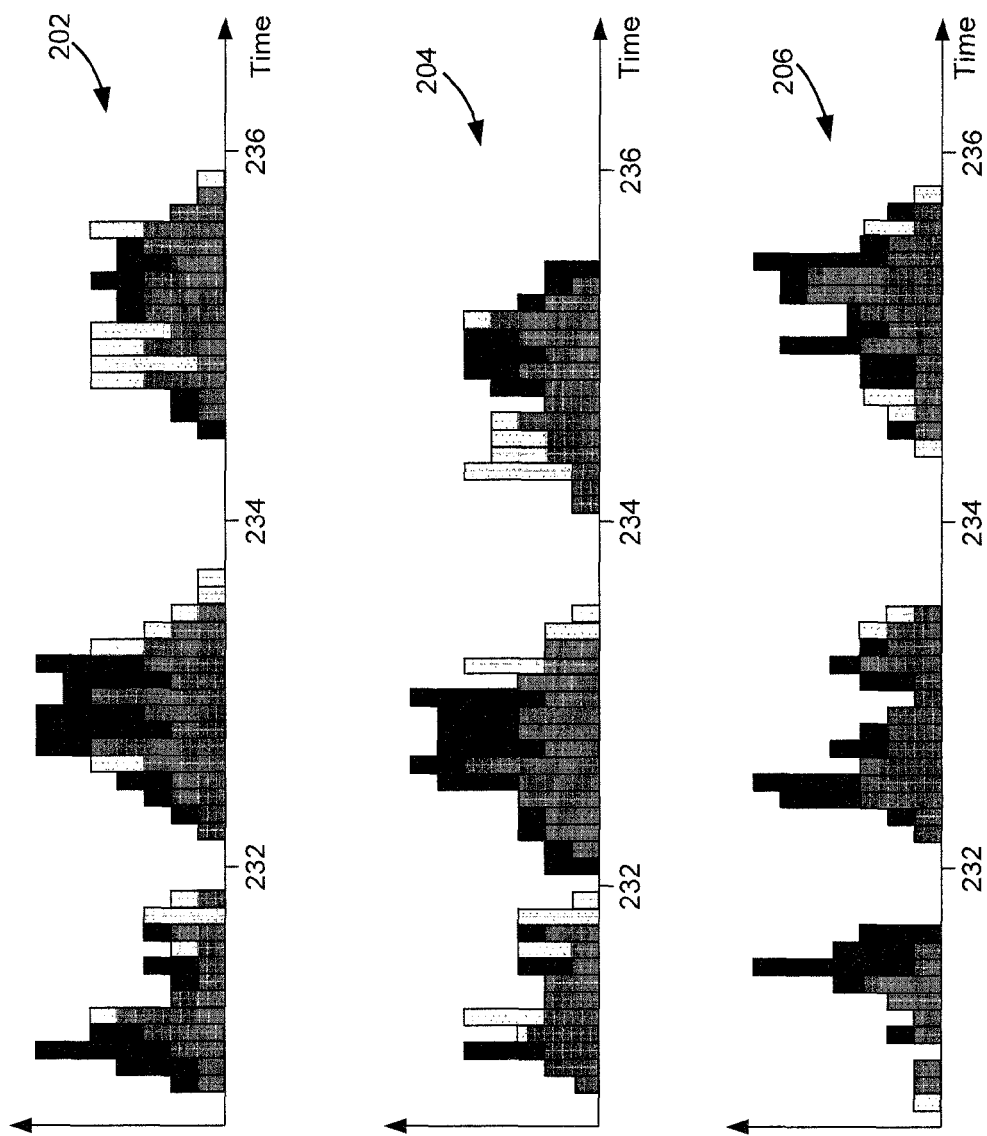
FIG. 2 is a graphical illustration of time ordered sequence of parameters representing a real-time voice over IP (VoIP) session received from an originator; and of reference data items which include (each) a time ordered sequence of parameters representing at least a portion of a previous CMS, according to some embodiments of the invention.

Reference is now made to FIG. 2 which is a graphical illustration of time ordered sequence of parameters representing a real-time voice over IP (VoIP) session 202 received from an originator; and of reference data items 204 and 206 which include (each) a time ordered sequence of parameters representing at least a portion of a previous CMS, according to some embodiments of the invention. As mentioned above, according to some embodiments of the invention, the PSE module 112 may be adapted to calculate two or more progressive similarity scores, each with respect to a different instant during a progress of the real-time VoIP session 202. The PSE module 112 may be adapted to calculate the progressive similarity scores on-the-fly, during the progress of the VoIP session 202. For example, in FIG. 2, the PSE module 112 calculates a first progressive similarity score with respect to a first instant 232 during the progress of the VoIP session 202 and may proceed to calculate a second progressive similarity score with respect to a second instant 234 during the progress of the VoIP session 210. According to some embodiments of the invention, after the progressive similarity score with respect to the second instant 234 is calculated, the PSE module 112 may proceed to evaluate the similarity between the real-time VoIP 210 and the reference data items 204 and 206 based on the two similarity scores (the first being associated with instant 232 and the second being associated with instant 234). It would be appreciated that at instant 234 more CMS media data from the originator of the sessions becomes available, since as the real-time VoIP session 210 further progresses more and more media data from the originator is made available to the PSE module 112. In order to illustrate further embodiments of the invention, the similarity evaluation process with respect to the real-time VoIP session 202 and the reference data items 204 and 206 shown in FIG. 2 may proceed further beyond the second instant 234 and a third progressive similarity score may be calculated for the real-time VoIP session 202 and the reference data items 204 and 206 in respect of a third instant 236 during the progress of the real-time VoIP session 210. Further discussions of embodiments of the invention that are associated with the calculation of the third progressive similarity score shall be provided below.

According to some embodiments of the invention, the PSE module 112 may be adapted to implement progressive similarity criteria. The progressive similarity criteria may specify under what conditions a real-time CMS shall be considered to be similar to a reference data item. The progressive similarity criteria may depend on various components or characteristics of the real-time CMS in respect of which the criteria are to be applied. For example, as will be described in greater detail below, in case a certain real-time CMS belongs to a grey list relating to various characteristics of real-time CMSs that may be considered unwanted, the progressive similarity criteria that is to be applied in respect of that real-time CMS may be more flexible in respect of a real-time CMS, so that the level of progressive similarity needed for concluding in accordance with the progressive similarity threshold that the real-time CMS and a reference data item are similar, is relatively low, and/or so that the quantity of real-time CMS data and/or the number of progressive similarity scores needed for concluding in accordance with the progressive similarity threshold that the real-time CMS and a reference data item are similar, is relatively low, and should be considered progressive similarity.

The PSE module 112 may manage the progressive similarity evaluation process in respect of a certain pair of real-time CMS and a reference data item based upon the progressive similarity criteria associated with the pair. For example, in accordance with the progressive similarity criteria, the PSE module 112 may be adapted to determine the number of progressive similarity scores that are to be calculated for a certain pair. According to one example, the progressive similarity criteria may provide a certain predefined number (two or more) setting forth the minimal number of progressive similarity scores that should be calculated for a pair comprised of the real-time CMS and a reference data item, and the PSE module 112 may be adapted to determine whether the real-time CMS and a reference data item are similar or not based at least upon the predefined number progressive similarity scores. According to some embodiments of the invention, the PSE module 112 may be adapted to calculate the predefined number of progressive similarity scores for the real-time CMS and the reference data item, and to determine that whether the real-time CMS and the reference data item are similar or not based on the predefined number of scores. However, according to further embodiments of the invention, rather than providing a fixed number of scores, the progressive similarity criteria may set forth rules and/or certain parameters in accordance with which the number of similarity scores that should be calculated is to be determined on-the-fly. According to still further embodiments, the progressive similarity criteria may provide a minimal number of progressive similarity scores, and rules and/or parameters as to when and how to extended the number of progressive similarity scores that are to be calculated on-the-fly, for example, in accordance with the results of the initial progressive similarity scores.

According to some embodiments of the invention, the progressive similarity criteria may provide one or more similarity threshold(s). A similarity threshold may be used for determining whether a certain progressive similarity score (or scores) is indicative of a similarity between the portion of the real-time CMS data that is associated with the instant with respect to which the score is calculated and the corresponding portion of a reference data item. According to some embodiments of the invention, the PSE module 112 may apply the similarity threshold in respect of each progressive similarity score calculated or in respect of only some of the scores, and may consider some scores as a group. Another option is a similarity threshold that is directed towards an average of some or all of the available progressive similarity scores. The application of the similarity threshold may be performed in accordance with predefined rules or it may be dynamic and may depend on various parameters, including, but not limited to, the previous progressive similarity scores, the rate of media data exchanges during the real-time CMS, etc. Furthermore, the similarity threshold value may also be predefined, or in accordance with further embodiments of the invention the similarity threshold value may be dynamically determined based on various parameters made available during the progress of the real-time CMS.

According to some embodiments of the invention, in addition to or as an alternative to the similarity threshold, the progressive similarity criteria may include a dissimilarity threshold(s). The dissimilarity threshold may be used for determining whether a certain progressive similarity score (or scores) is indicative of dissimilarity between the portion of the real-time CMS data and a reference data item. According to some embodiments of the invention, in case a certain reference data item is associated with a progressive similarity score (or scores) that is below a dissimilarity threshold, the progressive similarity evaluation process may be terminated in respect of that reference data item.

It would be appreciated that, according to some embodiments of the invention, different similarity/dissimilarity thresholds may be provided for different scores, for example, a first similarity threshold may be associated with a first score and a second score, whereas a second similarity threshold may be associated with a third score, such that as the real-time CMS progresses and more data becomes available, a higher level of similarity is required in order to consider a certain progressive similarity score as being indicative of similarity. In accordance with another example, the lower the previous scores associated with a certain reference data item, the lower the dissimilarity threshold will be for the subsequent score calculated in respect of that reference data item, and thus, a higher level of similarity is needed as the real-time CMS progresses, if the reference data item is to remain in consideration.

According to some embodiments of the invention, progressive similarity evaluation may further include determining whether the real-time CMS and the reference data item or items are similar or not. The PSE module 112 module may use the progressive similarity criteria to determine whether a reference data item(s) is similar to the real-time CMS. According to some embodiments of the invention, according to the progressive similarity criteria, the PSE module 112 may be adapted to determine the progressive similarity between the real-time CMS and a reference data item based upon two or more progressive similarity scores associated with the real-time CMS and the reference data item. According to the progressive similarity criteria a pair comprised of a real-time CMS and a reference data item are to be considered similar if at all, or as an alternative, at least a certain number of the progressive similarity scores calculated for that pair indicate that the pair is similar as will be described in greater detail below. The evaluation of progressive similarity between a real-time CMS and a reference data item may take place after a certain number of progressive similarity scores (at least two) is calculated for the pair or in accordance with further embodiments of the invention, a trigger for evaluating the progressive similarity between a pair comprised of a real-time CMS and a reference data item may be determined on-the-fly, based upon various the provisional results of the progressive similarity evaluation process or based upon any other predefined parameters associated with the progressive similarity evaluation process, such as for example, a certain amount of real-time CMS data being received.

According to some embodiments of the invention, in accordance with a possible similarity criteria that may be implemented by the PSE module 112, the real-time CMS may be considered to be similar to a reference data item when a certain number (two or more) of progressive similarity scores calculated for that pair is above a dissimilarity threshold, and/or if a certain number of progressive similarity scores calculated for that pair are above a similarity threshold. According to a further embodiments of the invention, in accordance with one possible similarity criteria implemented by the PSE module 112, the real-time CMS may be considered to be similar to a reference data item, if a certain number (two or more) of progressive similarity scores calculated for that pair provide an average progressive similarity score that is above a dissimilarity threshold, and/or if a certain number of progressive similarity scores calculated for that pair provide an average progressive similarity score that is above a similarity threshold.

According to some embodiments of the invention, in accordance with the similarity criteria, in some cases where a progressive similarity score calculated for the real-time CMS and a certain reference data item is below a similarity threshold and/or in some cases where a progressive similarity score calculated for the real-time CMS and a certain reference data item is above a dissimilarity threshold, the PSE module 112 may conclude that at least one more additional progressive similarity scores are needed in order to establish similarity or lack thereof, and accordingly, the PSE module 112 may continue the progressive similarity evaluation process and may calculate an additional progressive similarity score(s) for the real-time CMS and the reference data item. For example, in accordance with a similarity criteria implemented by the PSE module 112, the PSE module 112 may be adapted to apply both a similarity threshold and a dissimilarity threshold in respect of a certain progressive similarity score, and the PSE module 112 may be configured such that if a certain progressive similarity score falls between the similarity threshold and the dissimilarity threshold the progressive evaluation process should be continued, and an additional progressive similarity score or scores should be calculated.

For example, in FIG. 2 and according to some embodiments of the invention, according to the progressive similarity criteria implemented by the PSE module 112, the first progressive similarity score for each of the available reference data items, and in the case of FIG. 2 reference data items 204 and 206, is to be calculated in respect of a first instant 232 during the progress or the real-time VoIP session 202. Based on the first progressive similarity score, reference data items which are associated with a relatively low progressive similarity score are determined to be dissimilar and are withdrawn from further consideration. For example, after the first progressive similarity score is calculated, the PSE module 112 may implement a progressive dissimilarity threshold that is designated for a first progressive similarity score to determine whether any of the reference data items 204 and 206 is associated with a first progressive similarity score that is below the predefined threshold. In FIG. 2, and in accordance with some embodiments of the invention, following instant 232 and the calculation of the first progressive similarity score, the PSE module 112 may be adapted to implement a dissimilarity threshold with respect to the first progressive similarity score associated with each of the reference data items 204 and 206 participating in the progressive similarity evaluation process. The PSE module 112 may be configured to discard any reference data item that is associated with a first progressive similarity score that falls below the dissimilarity threshold. In the example shown in FIG. 2, following instant 232 and based upon the progressive similarity score and a dissimilarity threshold implemented in respect thereof, the PSE module 112 may be adapted to discard reference data item 206 from further consideration. Accordingly, the progressive similarity evaluation process in respect of reference data item 206 may be discontinued beyond instant 232. In FIG. 2 the progressive similarity score calculated in respect of instant 232 for the real-time VoIP session 210 and reference data item 204 is above the dissimilarity threshold. Accordingly, the PSE module 112 may be configured to continue the progressive evaluation process in respect of reference data item 204.

As mentioned above, according to embodiments of the invention, progressive similarity evaluation is based upon at least two progressive similarity scores. Accordingly, the PSE module 112 may be adapted to continue the progressive similarity evaluation process and may be adapted to calculate at least a second progressive similarity score in respect of each of the remaining reference data items. For example, in FIG. 2 the PSE module 112 may be configured to calculate a second progressive similarity score in respect of instant 234 for each of the remaining (if any) reference data items, and in this case for reference data item 204, and the real-time VoIP session 202. There are several scenarios which may be implemented by the PSE module 112 after the second progressive similarity score is calculated. Examples of such scenarios include, but are not limited to, any of the following and any combination thereof:

a. Providing that both the first and the second progressive similarity scores are relatively high, the PSE module 112 may determine that the real-time VoIP session 202 and the reference data item 204 should be considered similar and the real-time VoIP session 202 should be handled accordingly, as will be described in further detail below.

b. Providing that one of the first two progressive similarity scores or that one of the first two progressive similarity scores (and possibly a particular one of the two) are relatively low, the PSE module 112 may determine that the real-time VoIP session 202 and the reference data item 204 are to be considered as being dissimilar and the real-time VoIP session 202 should be handled accordingly; and c. Providing that at least one (and possibly a particular one) of the first two progressive similarity scores is neither relatively high nor relatively low, or in accordance with a further example with one score is relatively high and the other is relatively low, the PSE module 112 may decide to continue with the progressive similarity evaluation process with respect to the real-time VoIP session 202 and the reference data item 204 and may calculate an additional progressive similarity score(s) in respect of that pair. Then, further on during the progress of the real-time VoIP session 202 and after one or more additional scores are calculated, the PSE module 112 module may apply the progressive similarity criteria onto the scores and reattempt to determine whether the real-time VoIP session 202 and the reference data item 204 are similar or not. In FIG. 2, following the calculation of the second progressive similarity score, and based on the result of one or both of the two scores, the PSE module 112 may decide that an additional score is needed and may calculate a third progressive similarity score based upon the available VoIP data that is available at instant 236 and a corresponding portion of the reference data item 204. After the third progressive similarity score is calculated, the PSE module 112 may revisit the progressive similarity criterion, and may reattempt to determine whether the real-time CMS 202 and the reference data item 204 are similar or dissimilar.

It should be appreciated that the above scenarios are provided by way of illustration only, and that various other progressive similarity criteria may be devised in accordance with some embodiments of the invention.

According to some embodiments of the invention, once the PSE module 112 detects an unwanted real-time CMS, for example, once the PSE module 112 determines that a certain real-time CMS is similar or substantially identical to a previous CMS, the PSE module 112 may be adapted to terminate the real-time CMS without delay. According to further embodiments of the invention, the PSE module 112 may terminate the real-time CMS during its progress and as soon as it is determined that the real-time CMS and one or more reference data item(s) satisfy the progressive similarity criteria. The PSE module 112 may be configured to identify a real-time CMS as being unwanted based upon a unwanted CMS detection criteria. According to an unwanted CMS detection criteria a real-time CMS may be identified as being unwanted if it is determined the real-time CMS and at least a reference data item or if the real-time CMS and at least a certain number of reference data items comply with a progressive similarity criteria. According to further embodiments of the invention, an unwanted CMS detection criteria may provide additional conditions which the real-time CMS and/or the reference data items must comply with in order for the real-time CMS to be considered unwanted. For example, according to an unwanted CMS detection criteria, a real-time CMS is considered to be unwanted if according to the progressive similarity criteria there is at least a predefined number of reference data items that are substantially identical to the real-time CMS, and the similar reference data items are relatively recent. It should be noted however, that any reference data item that is not sufficiently recent may be filtered before the progressive similarity evaluation process in initiated in respect thereof.

It should be appreciated that, the progressive similarity evaluation process suggested in accordance with some embodiments of the invention, is directed towards detecting and blocking unwanted sessions based upon a progressive measure of similarity in respect of previous CMSs, such that a real-time CMS is determined to be unwanted when there is at least one or at least a predefined number of previous CMSs which are identical or virtually identical to the present real-time CMS. In this context, some embodiments of the invention stipulate that authentic CMSs cannot be identical or substantially identical to one another, especially if a plurality of CMS are identified as being virtually identical. Furthermore, even if the sessions are subjected to artificial modifications to avoid identical sessions, the extent of the modifications is typically limited, especially if a relatively large number of synthetic sessions is generated. Some embodiments of the present invention suggest implementing appropriate progressive similarity criteria, so as to identify the artificially modified sessions as being similar or as being substantially identical.

It would be further appreciated, that real-time CMS traffic should not be significantly delayed, and that otherwise the flow of conversation may be significantly compromised. On the other hand, in order to prevent or to reduce the harmful effects of unwanted CMS traffic, the unwanted CMS should be prevented if possible, or at least discontinued as soon as possible. The progressive similarity evaluation process suggested in accordance with some embodiments of the invention for detecting unwanted CMS traffic may offer a desirable tradeoff in the sense that it enables relatively fast and reliable detection of similarity between a real-time CMS and a previous CMS. It would be further appreciated that according to some embodiments of the invention, if the similarity between the real-time CMS and one or more previous CMSs (represented by one or more reference data items) progressive similarity may be established based on a relatively small amount of accumulated data and/or within a relatively short period of time since the start of the real-time CMS.

According to some embodiments of the invention, once the PSE module 112 determines that a certain real-time CMS is unwanted, for example based upon progressive similarity criteria and unwanted CMS detection criteria, the PSE module 112 may generate a CMS traffic control rule. The CMS traffic control rule may enable CMS traffic control. According to some embodiments of the invention, the traffic control rule may include data in respect of the real-time CMS which was determined to be unwanted. For example, according to some embodiments of the invention, after a certain real-time CMS is identified as being unwanted, a CMS traffic control rule may be generated which includes certain data in respect of one or more characteristics of the unwanted CMS, such as media data (either explicitly or in some sort of compressed form, for example) of the unwanted CMS, data in respect of certain signaling data associated with the unwanted CMS, etc.

The traffic control rule may enable a PSE module 112 to control future CMS traffic. For example, the CMS traffic control rule may enable the PSE module 112 to identify similarity between a future real-time CMS and the unwanted CMS (which at some future time shall be considered as a previous CMS). In accordance with the CMS traffic control rule, a reference data item may be generated and may be stored within the reference database 114 so as to enable a PSE module 112 module associated with the reference database 114 to use the reference data item to detect unwanted CMS traffic (together with to any additional reference data items). The CMS traffic control rule may be distributed throughout the network so as to enable additional PSE modules to detect unwanted CMS traffic based on the CMS traffic control rule. It should be appreciated that recording data in respect of a CMS is not limited to unwanted CMSs, and rather a reference data item may be created in respect of allowed CMSs as well. For example, initial CMSs which are part of an unwanted bulk of CMS traffic may not be identified as being unwanted according to a progressive similarity criteria implemented by a certain PSE module 112. It is only after a certain number of CMSs are received that enough reference data becomes available to enable the PSE module 112 to identify the subsequent CMSs as being unwanted and to control the incoming CMS traffic accordingly.

According to further embodiments of the invention, either in addition or as an alternative to media data, a CMS traffic control rule may also relate to signaling data of the real-time CMS. The CMS traffic control rule may include, for example, an IP address of an originator of the real-time CMS, a domain name associated with the originator of the originator of the real-time CMS, a header of the real-time CMS, or any other signaling data. Thus, the CMS control rule may provide various signaling data which may assist in detecting and controlling unwanted CMS data. The signaling data provided by a CMS traffic control rule may be used to generate a "grey list" of CMS traffic which is associated with signaling data that is indicative of suspected CMS traffic. For example, in case a PSE module 112 identifies that a real-time CMS includes certain signaling data, and in accordance with certain CMS traffic control rule, the PSE module 112 determines that the signaling data is associated with suspected CMS traffic, as part of a progressive similarity evaluation process in respect of the real-time CMS, the PSE module 112 may adjust the progressive similarity evaluation process, for example, so that similarity may be more quickly established (based on less media data). It would be appreciated that the PSE module 112 may otherwise adjust the progressive similarity evaluation process when the PSE module 112 identifies that a real-time CMS includes certain signaling data, and in accordance with a certain CMS traffic the PSE module 112 determines that the signaling data is associated with suspected CMS traffic. According to further embodiments of the invention, similar to the grey lists discussed above, the PSE module 112 module may create "white lists" and/or "black lists" based on signaling data of detected unwanted CMS traffic.

Figure 3:
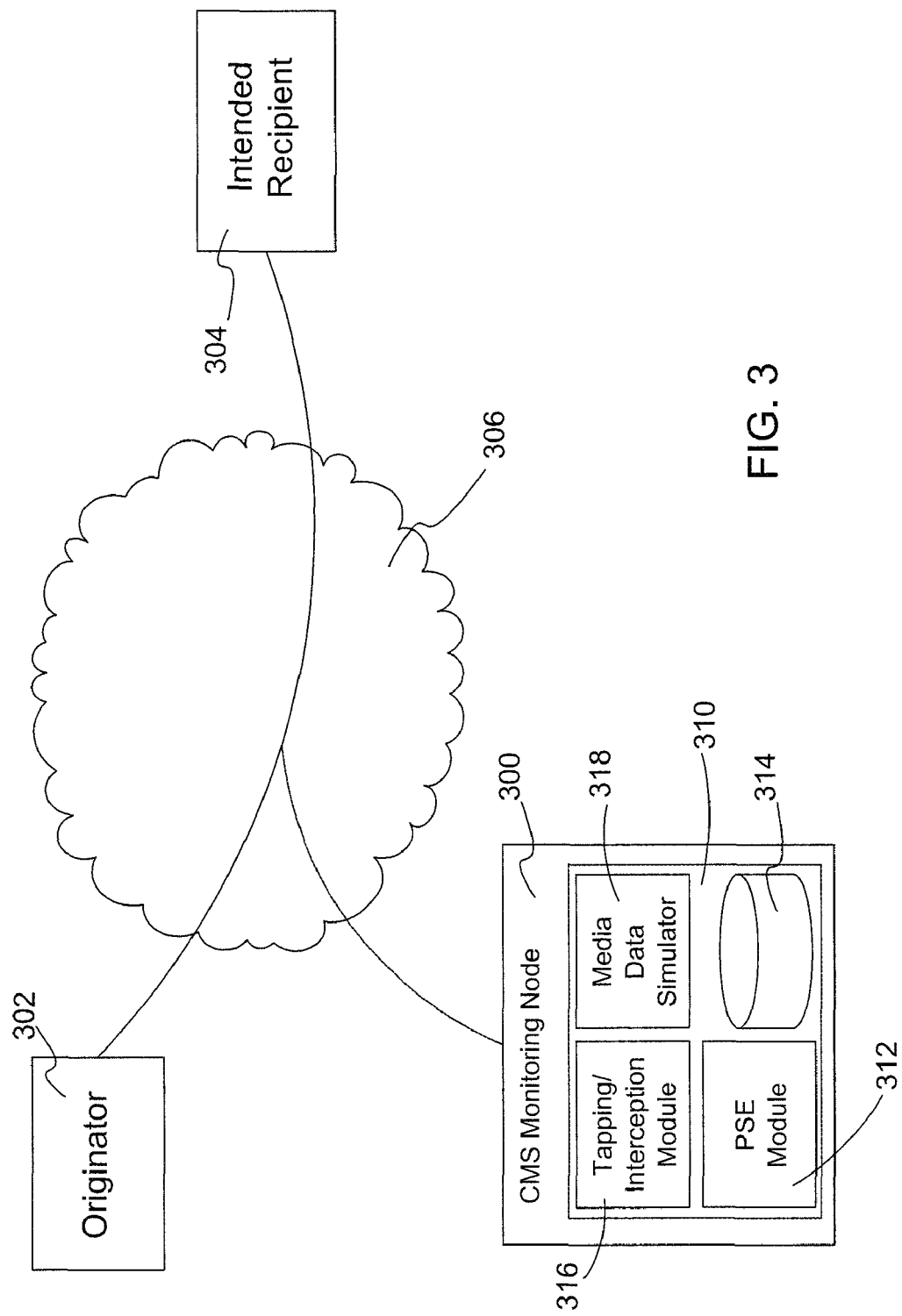
FIG. 3 is a block diagram of an optional implementation of a system for detecting unwanted conversational media sessions, according to some embodiments of the invention.

Reference is now made to FIG. 3, which is a block diagram of an optional implementation of a system for detecting unwanted conversational media sessions, according to some embodiments of the invention. In FIG. 3, a system for detecting unwanted CMS traffic 310 is implemented as part of a CMS monitoring node 300. The CMS monitoring node 300 may be connected to a network 306. The network 306 may also be the conduit for communications between one or more originators of CMS traffic 302 and one or more intended recipients 304, and in particular of real-time CMS communications. According to some embodiments of the invention, the CMS monitoring node 300 may be associated with one or more originators of real-time CMS traffic and/or the CMS monitoring node 300 may be associated with one or more intended recipients of real-time CMS traffic. According to further embodiments of the invention, the CMS monitoring node 300 may not be associated with any particular originator(s) or recipient(s). For example, the CMS monitoring node 300 may be configured to monitor and evaluate CMS traffic randomly with no connection to any particular originator or to any particular recipient.

In FIG. 3, the system for detecting unwanted CMS 310 may be attached to the monitoring node 300 rather than to any particular intended recipient 304 of CMS traffic. The monitoring node 300 may include a tapping/interception module 316. The tapping module 316 may be adapted to tap into real-time CMS traffic traversing the network. For example, the tapping module 316 may be adapted to tap into real-time CMS communications traversing the network between an originator 302 of the real-time CMS and a recipient of the real-time CMS traffic. Through the tap, the tapping module 316 may be adapted to obtain at least some of the real-time CMS data being exchanged. According to some embodiments of the invention, the tapping module 316 may be adapted to obtain the real-time CMS data without substantially interfering with the real-time CMS between the originator 302 and the intended recipient 304.

According to some embodiments of the invention, the real-time CMS data which was obtained through the tap may be fed to the PSE module 312. The PSE module 312 may be adapted to implement the progressive similarity evaluation process described above in respect of the real-time CMS data provided by the tapping module 316. As part of the progressive similarity evaluation process, the PSE module 312 may be adapted to measure the similarity between the real-time CMS data accumulated during the progress of the real-time CMS and provided by the tapping module 316 and one or more reference data items or portions of reference data items. As mentioned above, each reference data item may correspond to a previous CMS. As also described above, the reference data items may be stored within a reference database 314, and the PSE module 312 may obtain the data in respect of the reference data items from the reference database 314. In FIG. 3, and according to some embodiments of the invention, the reference database 314 is shown to be part of the system for detecting unwanted CMS 310 implemented on the monitoring node 300. However, it would be appreciated that further embodiments of the invention are not limited in this respect, and the reference database 314 may be implemented elsewhere, for example, the reference database 314 may be remotely implemented at a central location (servicing a plurality of PSE modules 312).

As mentioned above, the PSE module 312 may be adapted to determine whether there are reference data items which are similar enough (as determined by one or more thresholds) to the real-time CMS, and in conjunction with the results of the progressive similarity evaluation process the PSE module 312 may apply a unwanted CMS detection criteria to determine whether the real-time CMS is unwanted. According to some embodiments of the invention, in case the real-time CMS is determined to be unwanted, the system for detecting unwanted CMS 310 may be adapted to terminate the real-time CMS. It would be appreciated that the progressive evaluation process may enable the system for detecting unwanted CMS 310 to terminate a real-time CMS, while the session is in progress. For example, according to some embodiments of the invention, upon determining the real-time CMS is unwanted, the system 310 may instruct the intended recipient 304 to terminate the call (session).

Furthermore, in case the PSE module 312 determines that the real-time CMS is unwanted, the PSE module 312 may generate a CMS traffic control rule. As described in further detail above, the CMS traffic control rule may include some characteristic or parameters which are associated with the real-time CMS that has been determined to be unwanted, and may enable a recipient of the rule to identify CMS traffic which includes said characteristic or parameters or which include a characteristic or parameter which is correlated with the characteristic or parameter referred to in the CMS traffic control rule and to handle the suspected or unwanted CMS traffic accordingly. The CMS traffic control rule may be distributed to various nodes throughout the network, to enable other PSE modules or recipients of future CMS traffic to identify unwanted or suspected CMS traffic. As mentioned above, a CMS traffic control rule may including data in respect of signaling data associated with CMS traffic which has been identified as being unwanted and/or data in respect of media data or signature corresponding to media associated with CMS traffic which has been identified as being unwanted.

According to further embodiments of the invention, CMS monitoring point 300 may include an interception module either in addition or as an alternative to the tapping module 316. The interception module may be adapted to intercept CMS traffic traversing the network. For example, the interception module may be adapted to monitor traffic traversing the network or traversing a certain portion of the network, and upon identification of a session initiation message(s) associated with a real-time CMS, the interception module may be adapted to intercept the session initiation message(s). In accordance with one embodiment of the invention, the interception module may be adapted to intercept the real-time CMS session initiation messages before the messages are received at the intended recipient 304. The interception module may be adapted to establish a CMS call or a real-time CMS with the originator 302 of the real-time CMS session initiation messages to inspect the real-time CMS and to determine whether it is unwanted, as will be described in further detail below.

According to some embodiments of the invention, upon identifying and intercepting the real-time CMS session initiation message(s), the interception module may generate an appropriate response. As part of responding to the real-time session initiation messages, the interception module may be adapted to process the session initiation message(s). Based on the processed data, and based on any relevant other data, the interception module may be adapted to generate a response to the session initiation message in a manner to cause the originator 302 of the session initiation messages to establish the real-time CMS with the monitoring node 300 rather than with the intended recipient 304. It would be appreciated that according to some embodiments of the invention, the interception module may be configured to utilize any presently known or yet to be devised in the future method of technique for intercepting the real-time CMS data and in particular the real-time CMS session initiation message(s). For instance, the real-time CMS packet data traffic may be passed through a routing module that in addition to plain routing, may also be configured to filter the data packets according to some rules (for instance, certain CMS traffic), and may pass an exact replica of the filtered traffic on a separate output port to a monitoring module; the monitoring module may be equipped with suitable logic for monitoring and analyzing CMS traffic, e.g. following the call setup and call control logic.

According to some embodiments of the invention, once a real-time CMS is established between the CMS monitoring node 300 and the originator 302, the PSE module 312 may be configured to begin the aforementioned progressive similarity evaluation process based upon the media data received from the originator 302 during and as part of the real-time CMS. According to some embodiments of the invention, if the initial media data that is provided by the originator 302 and that is received at the CMS monitoring node 300 is not enough to complete the progressive similarity evaluation process, the PSE module 312 in cooperation with a media data simulator 318 may generate media data responses which are intended to entice the originator 302 to provide further media data, so that the progressive similarity evaluation process may be concluded. According to some embodiments of the invention, as part of generating a media data response, the media data simulator 318 may be adapted to process the incoming media data and may provide in response pre-recorded media data. The media data provided by the media data simulator 318 may be intended to provide a logical response to the originator initial media data communication. However, further embodiments of the invention are not limited in this respect, rather according to some embodiments of the invention, the media data simulator 318 may divulge to the originator 302 certain details in connection with the interception and may request the originator 302 to make a certain statement which may be used as part of the progressive similarity evaluation process. The media data simulator 318 may be adapted to utilize various media processing algorithms and various media generation algorithms to process the incoming media data and to generate, on-the-fly, an appropriate response. Various speech processing and speech reconstruction and/or image processing and image reconstruction or any other media processing and/or media generation techniques may be utilized by the media data simulator 318.

Once the PSE module 312 has enough media data to determine whether the real-time CMS is similar to one or more of the reference data items, the PSE module 312 may use the unwanted CMS detection criteria to determine whether the originator's 302 intention was to establish an unwanted real-time CMS with the intended recipient 304. If the PSE module 312 determines, based on the intercepted media data that the real-time CMS which the originator 302 was seeking to establish is an unwanted CMS, the CMS monitoring node 300 may block the real-time CMS. Blocking the real-time CMS may include any one of the following and any combination thereof: discontinuing or dropping the call at the intermediary node's 300 end; blocking the session from arriving at the intended recipient and not allowing the call to proceed to its intended recipient; diverting the real-time CMS to an alternative address, for example, diverting the call to a voice/multimedia mailbox, etc. According to further embodiments of the invention, either in addition or as an alternative to blocking or otherwise handling the real-time CMS which has been determined to be unwanted, the PSE module 312 may be adapted to generate one or more CMS traffic control rules, as was described in greater detail above.

The PSE module 312 may also be adapted to update the reference database 314 with data about the real-time CMS, so as to enable future implementation of the progressive similarity evaluation process in respect of the real-time CMS (which will be considered as a previous CMS). According to some embodiments of the invention, the module 312 may be adapted to record data in respect of the real-time CMS within the reference database 314 regardless of the results of the unwanted CMS detection process.

If however, the PSE module 312 decides that the real-time CMS is not unwanted, for example, based on the unwanted CMS detection criteria, the PSE module 312 may be adapted to establish a real-time CMS between the originator 302 and the intended recipient 304. According to some embodiments of the invention, the real-time session between the originator 302 and the intended recipient 304 may be established through the intermediary node 300. However, according to further embodiments of the invention, the intermediary node 300 may only be involved in establishing the session between the parties but may not be a participant itself. According to further embodiments of the invention, the unwanted CMS detection process (including the progressive similarity evaluation process) may be transparent to the intended recipient. However, according to further embodiments of the invention, the intermediary node 300 may be adapted to inform the intended recipient 304 of the unwanted CMS detection process. As part of updating the intended recipient 304 the intermediary node 300 may provide the intended recipient 304 with details of the results of the unwanted CMS detection process with respect to the real-time CMS.

According to further aspects of the present invention there is provided a method of detecting unwanted CMS traffic which includes obtaining a sequence of significant attributes directly from a bit-stream corresponding to a real-time CMS, and evaluating similarity between the sequence of significant attributes associated with the real-time CMS and a reference data item corresponding to a sequence of significant attributes of a bit-stream associated with a previous CMS. The direct bit-stream similarity evaluation process may be applied onto the media portion of the real-time CMS. Also, according to a further embodiment of the invention, the reference data item may include data corresponding to significant attributes taken or extracted from a bit-stream corresponding to a media portion of a previous CMS. According to some embodiments of the invention, the direct bit-stream similarity evaluation process does not require the real-time CMS media data being decoded and may be applied to the encoded data stream.

It should be appreciated that according to some embodiments of the invention, the direct bit-stream similarity evaluation process, which will be described in further detail below, may be implemented as part of the progressive similarity evaluation process. For example, as part of a progressive similarity evaluation process, one or more progressive similarity scores may be calculated using the direct bit-stream similarity evaluation process according to some embodiments of the invention. The application of the direct bit-stream similarity evaluation process for calculating a progressive similarity score may include, for example, obtaining a sequence of significant attributes directly from a bit-stream corresponding to real-time CMS data accumulated up to a certain instant during the progress of the real-time CMS, and calculating a progressive similarity score based upon a similarity between the obtained sequence of significant attributes and a reference data item corresponding to a sequence of significant attributes of a bit-stream associated with a previous CMS or with some portion thereof. The direct bit-stream similarity evaluation process may be repeated in respect of different instants during the progress of the real-time CMS so as to enable progressive similarity evaluation between the real-time CMS and the reference data based upon the two or more progressive similarity scores.

However, it should be appreciated, that according to further embodiments of the invention, the direct bit-stream similarity evaluation process may be implemented by a system for detecting unwanted CMS independently from any other similarity evaluation process including the progressive similarity evaluation process. For example, the direct bit-stream similarity evaluation process may be applied in respect of a certain amount of accumulated real-time CMS bit stream data, and the conclusion with regard to the real-time CMS being unwanted or not may be arrived at based on a single application of the similarity measure rather than being based upon a repeated progressive application as is suggested by the progressive similarity evaluation process.

Figure 4:
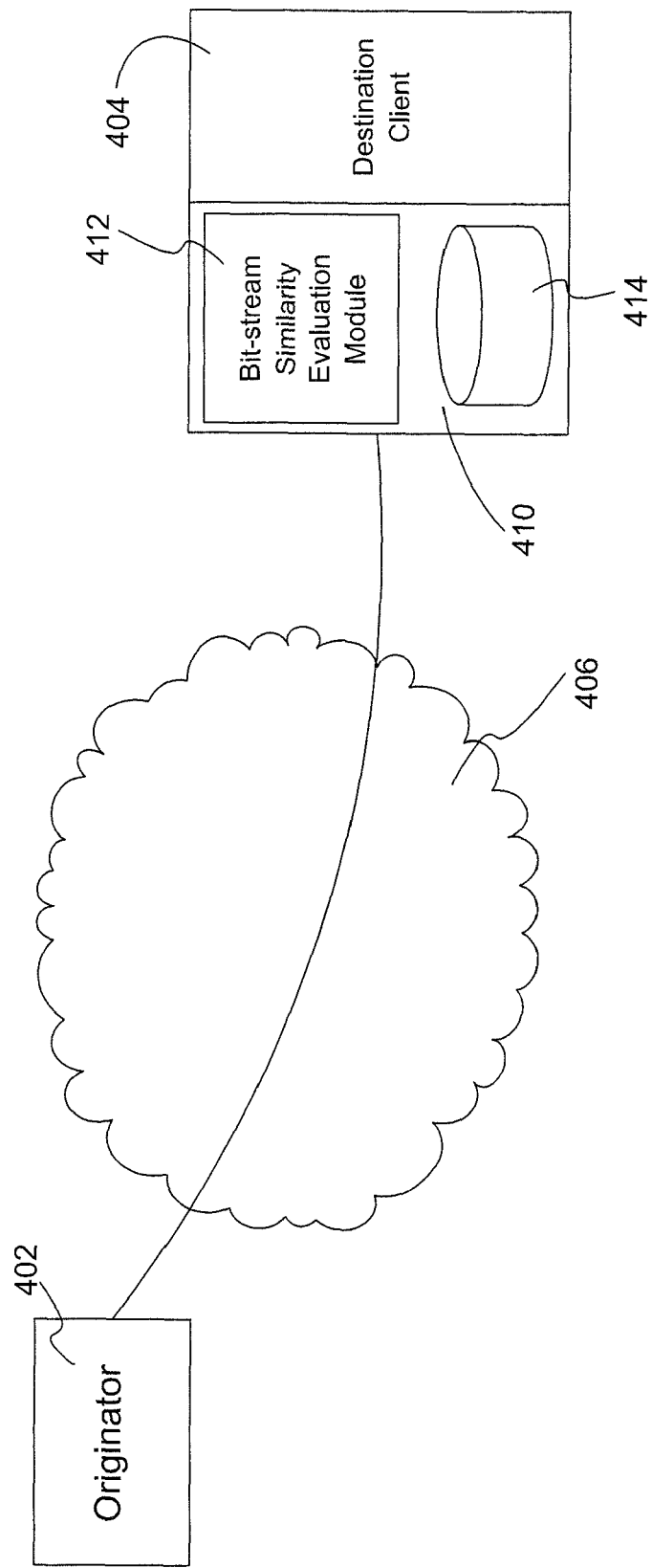
FIG. 4 is a simplified block diagram illustration of certain implementations of a system configured for implementing a direct bit-stream similarity evaluation process for detecting unwanted CMS traffic.

Reference is now made to FIG. 4, which is a simplified block diagram illustration of certain implementations of a system configured for implementing a direct bit-stream similarity evaluation process for detecting unwanted CMS traffic. In FIG. 4, and according to some embodiments of the invention, the system for detecting unwanted CMS traffic 410 may be configured to implement a direct bit-stream similarity evaluation process as part of detecting unwanted CMS traffic. The direct bit-stream similarity evaluation process shall be described in greater detail below. The system for detecting unwanted CMS traffic 410 may be adapted to implement the direct bit-stream similarity evaluation process either in conjunction with the progressive similarity evaluation process described above, for example, for the purpose of calculating one or more progressive similarity scores, or as an alternative and in accordance with further embodiments of the invention, the direct bit-stream similarity evaluation process may be an autonomous similarity evaluation process utilized by the system 410 for detecting unwanted CMS traffic. In particular, the similarity evaluation process implemented by the system 410 shown in FIG. 4 may be applied in respect of a specific instant during the progress of the CMS or in respect of the entire real-time CMS media data. Further details in respect of the direct bit-stream similarity evaluation process in accordance with some embodiments of the invention shall be provided below.

Returning back to FIG. 4, the system for detecting unwanted CMS 410 may include a bit-stream similarity evaluation module 412 and a reference database 414. The bit-stream similarity evaluation module 412 may be adapted to detect real-time CMS traffic, for example, by detecting CMS signaling data or CMS initiation messages or by detecting real-time CMS media data. In one implementation of the similarity evaluation module 412, a sniffer (not shown) may be employed to detect and capture CMS data transmitted on the network. Upon detection of the real-time CMS traffic, the bit-stream similarity evaluation module 412 may implement a direct bit-stream evaluation process to determine whether the detected real-time CMS is unwanted. In FIG. 4, and according to some embodiments of the invention, the system for detecting unwanted CMS 410 is shown to be attached to a specific intended recipient 404 of a real-time CMS. However, according to further embodiments of the invention, the system for detecting unwanted CMS 410 may be associated with any other node within the network or with any other group of nodes, such as, with any node which belongs to a certain network domain or in accordance with still further embodiments of the invention, the system for detecting unwanted CMS 410 may not necessarily be attached to any particular node within the network, as for example, was described with reference to FIG. 3.

According to some embodiments of the invention, the reference database 414 may include one and typically more (i.e. a plurality) of reference data items. Each reference data item may correspond to a previous CMS or to a portion of a previous CMS. According to further embodiments of the invention, at least some of the reference data items within the reference database 414 may each include or may be associated with a sequence of significant attributes taken directly from the bit-stream of a previous CMS. It would be appreciated that a reference data item which includes a sequence of significant attributes derived from the bit-stream of a previous CMS may be obtained from the previous CMS in its encoded form and does not require the previous CMS to be decoded to that end. It should also be appreciated, that according to some embodiments of the invention, by including in respect of a previous CMS only a sequence of significant attributes taken directly from the (encoded and possibly compressed) bit-stream of a previous CMS rather than from the decoded media data of the previous CMS, a significant reduction with respect to the amount of storage space needed to store the reference data item may be achieved. As mentioned above, a previous CMS as used herein, unless specifically stated otherwise, relates to any CMS traffic traversing the network and intercepted or otherwise obtained. Thus, the reference data items are based upon actual CMS traffic, rather than being some sort of a simulation of CMS traffic.

Figure 5:
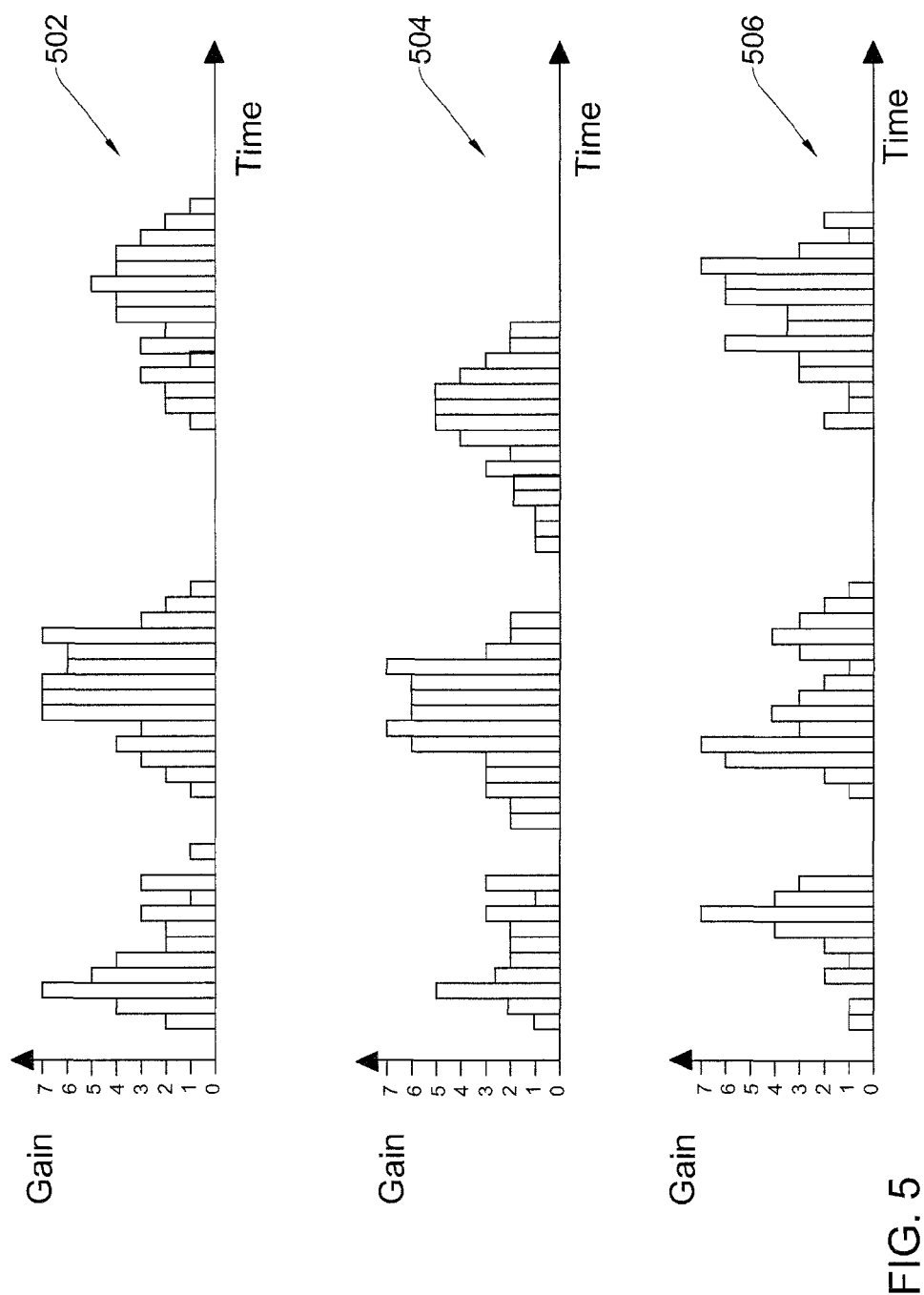
FIG. 5 is a symbolic representation of a time ordered sequence of significant attributes obtained from a bit-stream corresponding to a portion of a real-time CMS and of reference data items which include (each) data in respect of significant attributes obtained from a bit-stream corresponding to a portion of a previous CMS, according to some embodiments of the invention.

According to some embodiments of the invention, as part of implementing the similarity evaluation process, the bit-stream similarity evaluation module 412 may be adapted to obtain a sequence of significant attributes directly from a bit-stream corresponding to the real-time CMS. Reference is now additionally made to FIG. 5, which is a symbolic representation of a time ordered sequence of significant attributes obtained from a bit-stream corresponding to a portion of a real-time CMS and of reference data items which include (each) data in respect of significant attributes obtained from a bit-stream corresponding to a portion of a previous CMS, according to some embodiments of the invention. In FIG. 5, the topmost sequence of significant attributes 502 is obtained from a bit-stream corresponding to a portion of a real-time CMS. The reference data items 504 and 506 each includes data in respect of significant attributes obtained from a bit-stream corresponding to a portion of a previous CMS. By way of example, in FIG. 5 the sequence of significant attributes 502 captured from the bit-stream that corresponds to the real-time CMS, is comprised of a set of gain values which when decoded provide some of the data needed to represent the real-time CMS media data to a user, for example. Further by way of example, each gain value in the sequence corresponds to a sequence of three bits within the bit-stream which denote its value (between 0 and 7). Similarly the reference data items 504 and 506 each comprise data in respect of a set of gain values associated with a previous CMS. Examples of significant attributes which may be monitored as part of the direct bit-stream similarity evaluation process may include, but are not limited to the following: gain parameters and in particular gain parameters of the adaptive and/or the fixed codebooks, spectral parameters and in particular spectral parameters coded as LSP (Line Spectral Pair) parameters, and any combination thereof. Furthermore, it would be appreciated that some forms of CMS or some CMS protocols may include as part of the bit-stream more than one set of gain values or more than one set of any other type of data or value, and that according to some embodiments of the invention, the direct bit-stream similarity evaluation process may relate to only one set of values or to more than one set.

The bit-stream similarity evaluation module 412 may be adapted to evaluate similarity between the sequence of significant attributes 502 and the reference data item 504 and 506. According to some embodiments of the invention, as part of the direct bit-stream similarity evaluation process, the bit-stream similarity evaluation module 412 may be adapted to compare the sequence of significant attributes 502 obtained from a bit-stream corresponding to a portion of a real-time CMS with each of the reference data items 504 and 506.

The bit-stream similarity evaluation module 412 may be adapted to compare the sequence of significant attributes 502 obtained from a bit-stream corresponding to a portion of a real-time CMS with every available reference data item. However, according to further embodiments of the invention, the totality of reference data items may be subjected to preliminary elimination, so that the similarity evaluation process may be carried out only in respect of the reference data items which have not been eliminated during the preliminary process. The preliminary elimination screening process may be implemented in order to filter out reference data items which are not likely to result in high similarity in respect of the real-time CMS. According to some embodiments of the invention, the preliminary elimination process may be configured to be a relatively straightforward process. It would be appreciated that by introducing a relatively straightforward preliminary elimination process into the similarity evaluation process, a more stream-lined process may be achieved, and that by focusing the portion of the process which involves relatively complex comparison computations onto a more limited set of reference data items, overall complexity may be reduced.

According to some embodiments of the invention, the preliminary elimination process may include certain criteria which may be used for filtering the reference data items in respect of which the similarity evaluation process is to be discontinued. According to some embodiments of the invention, the criteria may relate to certain signaling data which may be associated with the reference data items. For example, according to one embodiment of the invention, one or more reference data items may include signaling data associated with the previous CMS with which the reference data item corresponds, and as part of the preliminary elimination process, the bit-stream similarity evaluation module 412 may be adapted to eliminate reference data items based upon signaling data included therein. For illustration, in accordance with one implementation of the system for detecting unwanted CMS 410, upon detecting a real-time CMS, the evaluation module 412 may be configured to capture the signaling data of the real-time CMS and may use that data to eliminate unrelated reference data items from being evaluated for similarity. For example, in case the captured signaling data is an IP address of the originator 402, the bit-stream similarity evaluation module 412 may implement (as part of the similarity evaluation process) a preliminary elimination process, and as a result of the preliminary elimination process only reference data items which include data in respect of an IP address that is within the same network domain as the originator's 402 IP address will be further considered for similarity as part of the similarity evaluation process.

According to some embodiments of the invention, the bit-stream similarity evaluation module 412 may implement a similarity threshold. The similarity threshold may be used for determining whether a real-time CMS and a certain reference data item(s) should be considered as being similar. The similarity threshold implemented by the bit-stream similarity evaluation module 412 may relate to the level of similarity between a sequence of significant attributes derived from the bit-stream which corresponds to the real-time CMS and data in respect of a sequence of significant attributes associated with a bit-stream which corresponds to a previous CMS as provided by a reference data item. The similarity threshold may be applied in respect of a plurality of reference data items to determine which ones, if any, provide a sufficiently high similarity score when compared with the data associated with the real-time CMS. For example, in accordance with one embodiment of the invention, in accordance with a similarity threshold, a sequence of significant attributes associated with the real-time CMS and a certain reference data item may be considered to be similar, if the similarity between the two sets of values is above a certain level.

According to some embodiments of the invention, the bit-stream similarity evaluation module 412 may be adapted to implement an unwanted CMS detection criteria on top of the similarity threshold to determine whether a real-time CMS is unwanted. Discussions of the relationship between an unwanted CMS detection criteria and the similarity threshold were provided above, in connection with the progressive similarity evaluation approach. However, it should be appreciated that the relationship between the unwanted CMS detection criteria and the similarity threshold(s) may be otherwise defined and characterized, for example, in accordance with the unwanted CMS detection criteria and one or more tolerance components may be implemented by the system for detecting unwanted CMS traffic 410 on top of or independently from the similarity threshold(s). In accordance with other embodiments of the invention, the system for detecting unwanted CMS traffic 410 may use the similarity threshold as the criteria for detecting unwanted CMS traffic, without any other further criteria being used.

According to some embodiments of the invention, the unwanted CMS detection process may incorporate one or more tolerance components. The tolerance components may allow for controlled inconsistencies between the real-time CMS and the reference data items, so that controlled similarity rather than absolute identity is the criterion for detecting unwanted CMS traffic. The tolerance components may be implemented as part of the similarity threshold employed by the similarity evaluation module 412. For example, one or more tolerance components, possibly in conjunction with other considerations, may be used to determine the level of similarity that is to be required in accordance with the similarity threshold for certain data in respect of a real-time and a reference data item to be considered as being similar. According to further embodiments of the invention, a tolerance component may be implemented across the entire range of reference data items, or in accordance with an alternative embodiment, in respect of only specific reference data item(s). According to a further embodiment of the invention, tolerance components may also be applied to control for a certain inconsistency between the data in respect of the real-time CMS and a reference data, so that the effect of that inconsistency is eliminated or decreased under certain circumstances. Some examples of tolerance values may include tolerance values which are intended to control for or account to inconsistencies which are associated with one or more of the following: packet loss over the data network, constant delay and delay variation (jitter) between sessions, etc.

The similarity evaluation module 412 may be adapted to implement the unwanted CMS detection criteria during the progress of the real-time CMS and in case it is determined that the real-time CMS is unwanted, the session may be terminated, and any further incoming communication, for example, from the originator 402 in connection with the real-time CMS may be rejected. However, according to further embodiments of the invention, the similarity evaluation module 412 may implement the unwanted CMS detection criteria only after the real-time CMS is completed and may not influence the progress of the real-time CMS. According to some embodiments of the invention, if it is determined that a real-time CMS is unwanted (for example, during the progress of the real-time CMS, or in accordance with another example, after the real-time is complete), the system for detecting unwanted CMS 410 may be adapted to generate one or more CMS traffic control rules. The CMS traffic control rules may be used to control future CMS traffic. As mentioned above, the CMS traffic control rules may be distributed to various nodes located throughout the network 406 to enable the nodes in receipt of the CMS control rules to control CMS traffic associated with those nodes, for example, to control CMS traffic whose intended recipient is that node. A more detailed description of various CMS traffic control rules was provided above with reference to the progressive similarity evaluation approach and is applicable mutatis mutandis to the direct bit-stream approach to evaluating similarity between data in respect of a real-time CMS and data in respect of a previous CMS.

Figure 6:
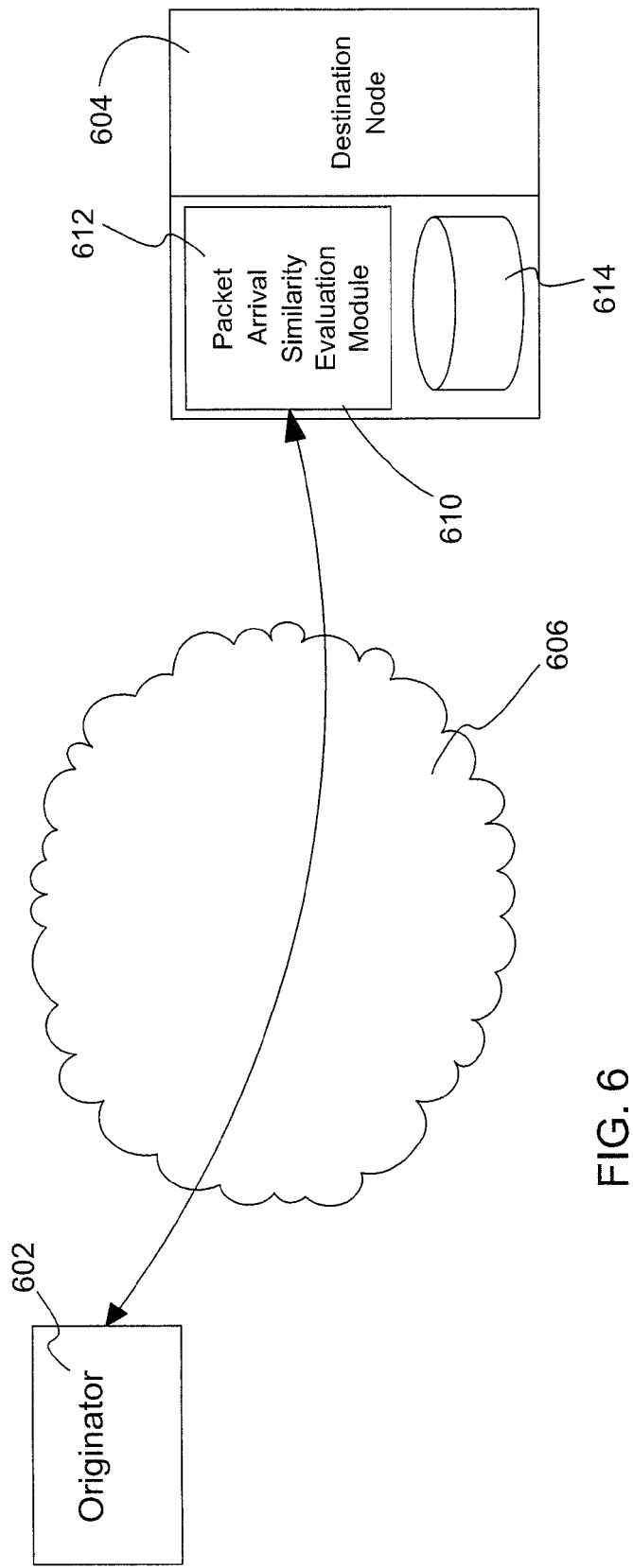
FIG. 6 is a simplified block diagram illustration of certain implementations of a system configured for implementing a packet arrival time similarity evaluation process for detecting unwanted CMS traffic.

Turning now to FIG. 6, there is shown a simplified block diagram illustration of certain implementations of a system configured for implementing a packet arrival time similarity evaluation process for detecting unwanted CMS traffic. In FIG. 6, and according to some embodiments of the invention, the system for detecting unwanted CMS traffic 610 may be configured to implement a packet arrival time similarity evaluation process as part of detecting unwanted CMS traffic. The packet arrival time similarity evaluation process shall be described in greater detail below. The system for detecting unwanted CMS traffic 610 may be adapted to implement the packet arrival time similarity evaluation process either in conjunction with the progressive similarity evaluation process described above, for example, for the purpose of calculating one or more progressive similarity scores, or as an alternative and in accordance with further embodiments of the invention, the packet arrival time similarity evaluation process may be an autonomous similarity evaluation process utilized by the system 610 for detecting unwanted CMS traffic. In particular, the similarity evaluation process implemented by the system 610 shown in FIG. 6 may be applied in respect of a specific (one) instant during the progress of the CMS or in respect of the entire real-time CMS media data. Further details in respect of the packet arrival time similarity evaluation process in accordance with some embodiments of the invention shall be provided below.

Returning back to FIG. 6, the system for detecting unwanted CMS 610 may include a packet arrival similarity evaluation module 612 and a reference database 614. The packet arrival similarity evaluation module 612 may be adapted to detect real-time CMS traffic, for example, by detecting CMS signaling data or CMS initiation messages or by detecting real-time CMS media data. In one implementation of the similarity evaluation module 612, a sniffer (not shown) may be employed to detect and capture CMS data transmitted on the network. Upon detection of the real-time CMS traffic, the packet arrival similarity evaluation module 612 may implement a packet arrival similarity evaluation process to determine whether the detected real-time CMS is unwanted. In FIG. 6, and according to some embodiments of the invention, the system for detecting unwanted CMS 610 is shown to be attached to a specific intended recipient 604 of a real-time CMS. However, according to further embodiments of the invention, the system for detecting unwanted CMS 610 may be associated with any other node within the network or with any other group of nodes, such as, with any node which belongs to a certain network domain or in accordance with still further embodiments of the invention, the system for detecting unwanted CMS 610 may not necessarily be attached to any particular node within the network, as for example, was described with reference to FIG. 3.

According to some embodiments of the invention, as part of implementing the similarity evaluation process, the packet arrival similarity evaluation module 612 may be adapted to obtain at least a sequence of packet arrival times in respect of a real-time CMS. According to further embodiments of the invention, the packet arrival similarity evaluation module 612 may be adapted to obtain the packet arrival data directly from the bit-stream which corresponds to the real-time CMS. The packet arrival data may include a sequence of packet inter-arrival times. Packet inter-arrival time can be defined as the amount of time between an arrival of a packet and the arrival of the next packet or as the amount of time between the arrival of a packet and the arrival of the previous packet. The sequence of packet arrival times or inter-arrival times may be obtained by the packet arrival similarity evaluation module 612 through direct monitoring of the bit-stream which corresponds to the real-time CMS. It should be appreciated that any known in the present or yet to be devised in the future method or technique that is suitable for timing the packet arrival times may be utilized as part of some embodiments of the invention to enable the monitoring and recording of the packet arrival or packet inter-arrival times.

According to some embodiments of the invention, the reference database 614 may include one and typically more (i.e. a plurality) of reference data items. Each reference data item may correspond to a previous CMS or to a portion of a previous CMS. According to further embodiments of the invention, at least some of the reference data items within the reference database 614 may include or may be associated with at least a sequence of packet arrival times corresponding to a previous CMS. In accordance with a further embodiment of the invention, one or more of the reference data items may include data in respect of packet inter-arrival times corresponding to a previous CMS. It would be appreciated that a reference data item which includes a sequence of packet arrival time or packet inter-arrival time may be created based upon data derived directly from the bit-stream of a previous CMS. The reference data maybe generated based upon data obtained from the previous CMS in its encoded form and the procurement of the reference data may not require the previous CMS to be decoded to that end. It should also be appreciated, that according to some embodiments of the invention, by including in respect of a previous CMS only a sequence packet, arrival times which are taken directly from the (encoded and possibly compressed) bit-stream of a previous CMS rather than from the decoded media data of the previous CMS, a significant reduction with respect to the amount of storage space needed to store the reference data item may be achieved. As mentioned above, a previous CMS as used herein, unless specifically stated otherwise, relates to any CMS traffic traversing the network and intercepted or otherwise obtained. Thus, the reference data items are based upon actual CMS traffic, rather than being some sort of a locally simulated CMS data.

Figure 7:
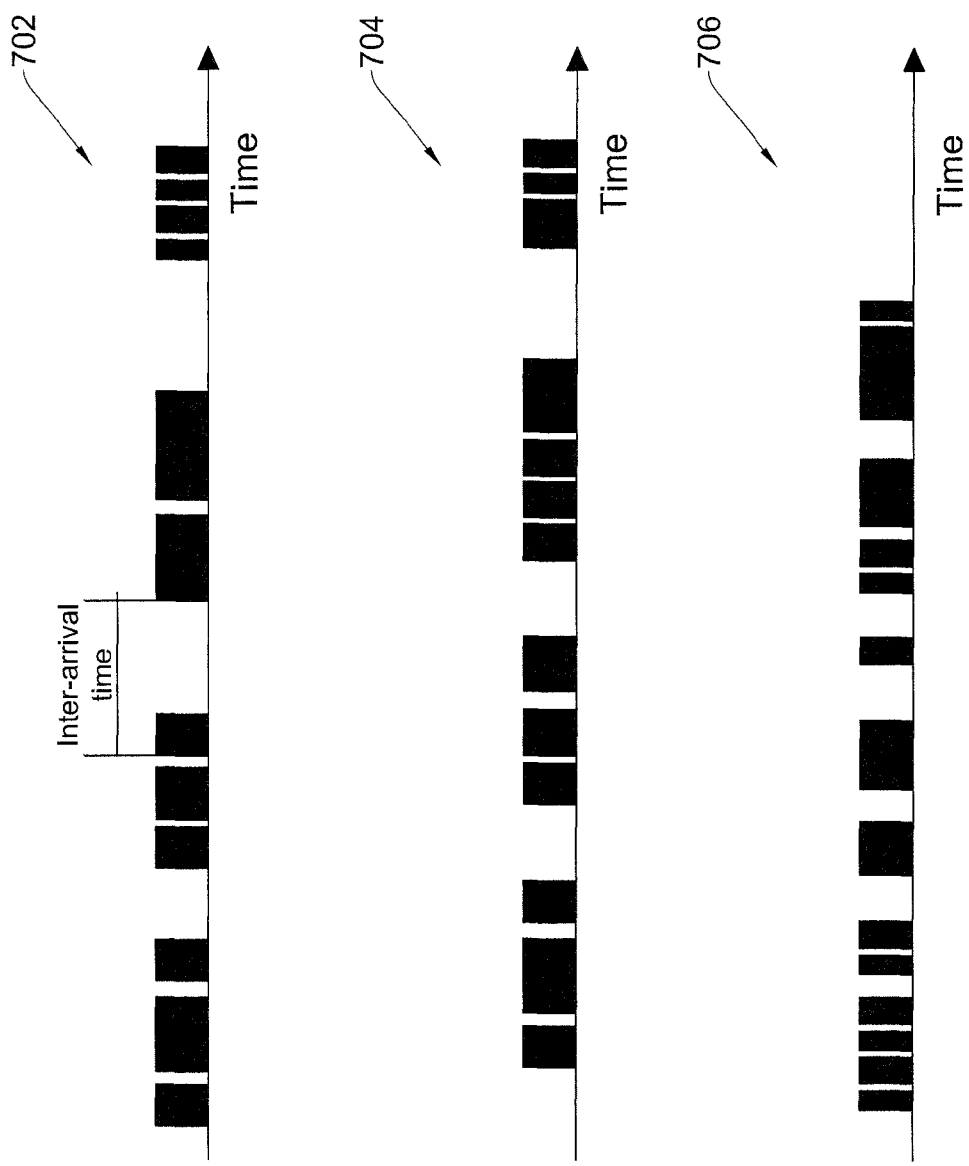
FIG. 7 is a symbolic representation of a stream of data packets corresponding to a portion of a real-time CMS and of reference data items which include (each) a stream of data packets corresponding to at least a portion of a previous CMS, according to some embodiments of the invention.

Reference is now additionally made to FIG. 7, which is a symbolic representation of a stream of data packets corresponding to a portion of a real-time CMS and of reference data items which include (each) a stream of data packets corresponding to at least a portion of a previous CMS, according to some embodiments of the invention. In FIG. 7, the stream of data packets 702 corresponds to at least a portion of a real-time CMS. As mentioned above, the packet arrival similarity evaluation module 612 may be adapted to obtain at least packet arrival data in respect of a real-time CMS. The packet arrival similarity evaluation module 612 may be adapted to obtain the packet arrival data directly from the bit-stream (or stream of data packets) 702 which corresponds to the real-time CMS. In FIG. 7 and according to some embodiments of the invention, the packet arrival similarity evaluation module 612 is adapted to generate the packet arrival data by measuring the time intervals between the time of arrival of each packet in the stream of packets 702 being monitored and the time of arrival of the next packet in stream. Each of the reference data items 704 and 706 shown in FIG. 7 may include at least data in respect of packet arrival times obtained in respect of a previous CMS. Each of the reference data items 704 and 706 may be generated based upon data obtained directly from a bit-stream (or stream of data packets) corresponding to at least a portion of a previous CMS.

The packet arrival similarity evaluation module 612 may be adapted to evaluate similarity between the packet arrival data corresponding to the stream of data packets 702 which corresponds to at least a portion of a real-time CMS and the reference data items 704 and 706. The packet arrival similarity evaluation process may include comparing the packet arrival data associated with the real-time CMS with the packet arrival data associated with the previous CMSs as provided by the reference data items 704 and 706. According to further embodiments of the invention, the packet arrival similarity evaluation module 612 may be adapted to evaluate similarity between the real-time CMS and the reference data items based upon a comparison of packet inter-arrival times obtained from the stream of data packets 702 which corresponds to at least a portion of a real-time CMS and packet-inter-arrival data provided by the reference data items 704 and 706, which as mentioned above, may be based upon streams of packets associated with previous CMSs.

As described in greater detail above with reference to the direct bit-stream approach to similarity evaluation, as part of the similarity evaluation process, and in particular as part of the packet arrival similarity evaluation process, the initial set of reference data items may be subject to a preliminary elimination process, so that the process of comparing packet arrival data is carried out in respect to a more focused set of reference data items. As is also mentioned above, the narrowed down set of reference data items may be achieved through a screening process that may be based upon a search for a certain characteristic that is associated with the real-time CMS within the reference data items. The characteristic upon which the screening process may be based may be selected such that the identification thereof within a reference data item is relatively straightforward so that compliance (or non-compliance) may be rather easily established.

According to some embodiments of the invention, the packet arrival similarity evaluation module 612 may implement a similarity threshold. The similarity threshold may be used for determining whether a real-time CMS and a certain reference data item(s) should be considered as being similar. The similarity threshold implemented by the packet arrival similarity evaluation module 612 may relate to the level of similarity between a sequence of packet arrival times associated with the real-time CMS and data in respect of a sequence of packet arrival times associated with a previous CMS as provided by a reference data item. According to further embodiments of the invention, the similarity threshold may relate to the level of similarity between a sequence of packet inter-arrival times associated with the real-time CMS and data in respect of a sequence of packet inter-arrival times associated with a previous CMS as provided by a reference data item. The similarity threshold may be applied in respect of a plurality of reference data items to determine which ones, if any, provide a sufficiently high similarity score when compared with the data associated with the real-time CMS. For example, in accordance with one embodiment of the invention, in accordance with a similarity threshold, a sequence of packet arrival times associated with the real-time CMS and a certain reference data item may be considered to be similar, if the similarity between the two sets of values is above a certain level.

According to further embodiments of the invention, the similarity threshold may further relate to the size of packets in the packet stream. The similarity evaluation module 612 may be adapted to obtain data with respect to the size of packets within a stream of packets associated with real-time CMS. The data in respect size of packets may be provided in the form of a sequence of packet sizes. The size of packets may be represented, for example, by the number of data bits included as part of each packet. However, it should be noted, that certain data bits may be disregarded when determining the size of a packet, such as for example, metadata packets, and only content (or media) data may be considered. The data with respect to the size of the packets may be obtained by the similarity evaluation module 612 through direct monitoring of the bit-stream (or packet stream) corresponding to the real-time CMS. It should be appreciated that any known in the present or yet to be devised in the future method or technique that is suitable for sizing the packets may be utilized as part of some embodiments of the invention to enable the monitoring and recording of the packet sizes.

According to further embodiments of the invention, at least some of the reference data items within the reference database 614 may include data in respect of the size of packets within a packet stream corresponding to a previous CMS. In accordance with a further embodiment of the invention, one or more of the reference data items may include data in respect of a sequence of packet sizes within a packet stream corresponding to a previous CMS. The reference data may be created based upon data obtained from the previous CMS in its encoded form and the procurement of the reference data may not require the previous CMS to be decoded to that end.

According to some embodiments of the invention, the similarity evaluation module 612 may be adapted to obtain the data with respect to the size of the packets in addition to (obtaining) the sequence of packet arrival times associated with the stream of packets corresponding to the real-time CMS. Furthermore, some of the reference data items may include, in addition to the sequence of packet arrival times associated with a packet stream corresponding to a previous CMS, data with respect to the size of the packets within the stream of packets corresponding to the previous CMS.

According to some embodiments of the invention, the similarity evaluation module 612 may be adapted to compare the sequence of packet arrival times associated with the real-time CMS with the data provided by a reference data item in respect of the packet arrival times associated with a previous CMS, and separately compare the data with respect to the size of packets associated with the real-time CMS with the data provided by a reference data item with respect to packet sizes associated with a previous CMS. The similarity evaluation module 612 may include a plurality of similarity thresholds to determine whether the results of at least the packet arrival times comparison and the packet size comparison are indicative of similarity or not. However, according to further embodiments of the invention, as part of the similarity evaluation process, the similarity evaluation module 612 may be configured to apply a transformation function to the set of values associated with the real-time CMS and the set of values provided by a reference data item and may compare the results of the transformation rather than performing multiple and discrete sets of calculation. An example of a suitable transformation function may include, but is not limited to, a transformation function which provides an empirical distribution of packet inter-arrival times and packet sizes.

According to some embodiments of the invention, the similarity evaluation module 612 may be adapted to implement an unwanted CMS detection criteria on top of the similarity threshold(s) to determine whether a real-time CMS is unwanted. Discussions of the relationship between an unwanted CMS detection criterion and the similarity threshold were provided above, in connection with the progressive similarity evaluation approach. However, it should be appreciated that the relationship between the unwanted CMS detection criteria and the similarity threshold(s) may be otherwise defined and characterized, for example, in accordance with the unwanted CMS detection criteria one or more tolerance components may be implemented by the system for detecting unwanted CMS traffic 610 on top of or independently from the similarity threshold(s). In accordance with other embodiments of the invention, the system for detecting unwanted CMS traffic 610 may use the similarity threshold as the criteria for detecting unwanted CMS traffic, without any other further criteria being used.

The similarity evaluation module 612 may be adapted to implement the unwanted CMS detection criteria during the progress of the real-time CMS and in case it is determined that the real-time CMS is unwanted, the session may be terminated, and any further incoming communication, for example, from the originator 602 in connection with the real-time CMS may be rejected. However, according to further embodiments of the invention, the similarity evaluation module 612 may implement the unwanted CMS detection criteria only after the real-time CMS is completed and may not influence the progress of the real-time CMS. According to some embodiments of the invention, if it is determined that a real-time CMS is unwanted (for example, during the progress of the real-time CMS, or in accordance with another example, after the real-time is complete), the system for detecting unwanted CMS 610 may be adapted to generate one or more CMS traffic control rules. The CMS traffic control rules may be used to control future CMS traffic. As mentioned above, the CMS traffic control rules may be distributed to various nodes located throughout the network 606 to enable the nodes in receipt of the CMS control rules to control CMS traffic associated with those nodes, for example, to control CMS traffic whose intended recipient is that node. A more detailed description of various CMS traffic control rules was provided above with reference to the progressive similarity evaluation approach and is applicable mutatis mutandis to the packet arrival times approach (with or without the additional data in respect of the packet sizes) to evaluating similarity between data in respect of a real-time CMS and data in respect of a previous CMS.

It should be appreciated that some of the discussions above made with reference to specific aspects of the invention, such as for example, with reference to the progressive similarity evaluation approach towards detecting unwanted CMS traffic and/or with reference to the direct bit-stream similarity evaluation approach towards detecting unwanted CMS traffic, may be included, implemented or applied as part of one or more of the other approaches towards detecting unwanted CMS traffic which are described herein as being part of further aspects of the invention. Thus, unless explicitly stated otherwise or if it is apparent from the text that the intention of the applicant is to the contrary, any discussion made throughout the specification and should be regarded as being part of mutatis mutandis any of the other aspects of the invention described in the present specification.

Reference is now made to a further aspect of the invention. According to some embodiments of the invention, a method of detecting unwanted CMS traffic may include utilizing a fake conversational client. The fake conversational client may be adapted to cause an originator of real-time CMS data to setup and initiate a real-time CMS with the fake conversational client. According to some embodiments of the invention, the fake conversational client may be adapted to generate a reference data item based upon at least a media portion of the incoming real-time CMS. The fake conversation client may be further configured to publish the reference data item in a manner to enable a client in receipt of the reference data item to control incoming real-time CMS traffic based upon a similarity between the incoming real-time CMS data and the reference data item.

Figure 8:
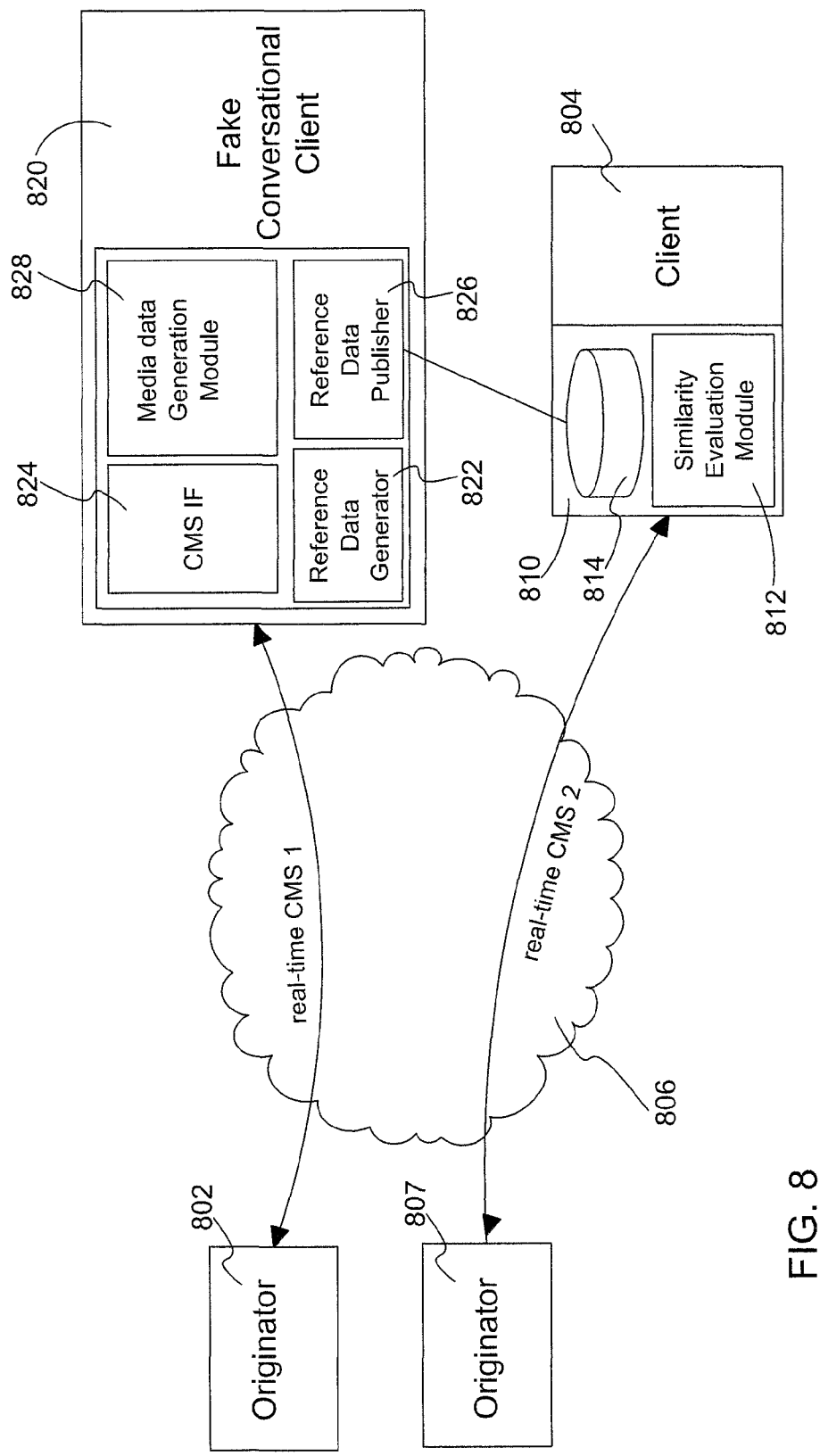
FIG. 8 is a block diagram illustration of a system for enabling detection of unwanted CMS traffic which includes a fake CMS client, according to some embodiments of the invention.

Reference is now made to FIG. 8 which is a block diagram illustration of a system for enabling detection of unwanted CMS traffic which includes a fake CMS client, according to some embodiments of the invention. In accordance with some embodiments of the invention, a system for enabling detection of unwanted CMS traffic 810 may be implemented as part of or may be associated with a fake CMS client 820. The fake CMS client 820 may be adapted to cause an originator 802 of real-time CMS data to setup, initiate and conduct a real-time CMS with the fake CMS client 820. As will be described in further detail below, the fake CMS client 820 may be adapted to decode incoming real-time CMS data. According to further embodiments of the invention, the fake CMS client 820 may be further adapted to generate synthetic CMS data, for example, in response to real-time CMS data received at the fake CMS client 820.

The fake CMS client 820 may include or may be associated with a reference data generator 822. The reference data generator 822 may be used to generate reference data items. The reference data generator 822 may be adapted to generate a reference data item based upon at least the media data or some portion thereof received at the fake CMS client 820 as part of a real-time CMS. The fake CMS client 820 may further include or may be associated with a reference data publisher 826. The reference data publisher 826 may be adapted to publish a reference data item generated by the reference data generator 822. The reference data publisher 826 may be configured to transmit, including by way of broadcast or multicast, a reference data item to one or more clients over the network 806, so that the reference data can be made available to one or more clients 804, thereby enabling the clients 804 in receipt of the reference data item to use the reference data item to control future CMS traffic. According to some embodiments of the invention the reference data publisher 826 may be configured to provide a reference data item generated at the fake CMS client 820 to one or more clients which are subscribers of the fake CMS client 820.

According to some embodiments of the invention, the fake CMS client 820 may include or may be associated with a CMS interface 824. The CMS interface 824 may be configured to enable the setup of the real-time CMS on the fake CMS client 820 end. The CMS interface 824 may be further adapted to control certain aspects of the real-time CMS while it is in progress. The CMS interface 824 may be adapted to receive the signaling data associated with the real-time CMS and may be adapted to generate any CMS signaling data necessary for setting up and/or for managing the real-time CMS. The CMS interface 824 may be adapted to interface various types of real-time CMS, including but not limited to VoIP sessions, video sessions, mixed voice/audio/real-time text chat, etc. The CMS interface 824 may be configured to operate in compliance with various protocols, standards and/or formats, including but not limited to, the H.323 family of standards, the SIP family of standards, etc. It would be appreciated that by providing a suitably configured CMS interface it may be possible to setup and manage a real-time CMS between a fake CMS client and an originator of the real-time CMS, without the originator of the real-time CMS being aware of the nature of the recipient.

According to some embodiments of the invention, the fake CMS client 820 may be adapted to utilize the reference data generator 822 to generate a reference data item based upon real-time CMS media data. According to further embodiments of the invention, the fake CMS client 820 may be adapted to utilize the reference data generator 822 to generate a reference data item based upon the media data received at the fake CMS client 820 during a real-time CMS. According to still further embodiments of the invention, as part of generating a reference data item, the reference data generator 822 may be adapted to monitor the incoming real-time CMS media data being received at the fake CMS client 820. The media data generator 822 may be adapted to record certain data in respect of the media data being received at the fake CMS client 820 as part of the real-time CMS. According to some embodiments of the invention, the reference data generator 822 may be adapted to obtain the data necessary for generating a reference data item directly from the bit-stream (or packet stream) corresponding to the real-time CMS. However, according to still further embodiments of the invention, the reference data generator 822 may obtain the necessary data from the decoded real-time CMS data. The reference data generator 822 may be configured to determine which type of data needs to be obtained and how to obtain that data in accordance with predefined rules. In accordance with one example of possible rules which may be implemented by the reference data generator 822, the type of data that needs to be obtained and/or the amount of data necessary for generating a reference data item, may depend upon various characteristics of the real-time CMS, such as for example, the underlying session type, the data flow rate, the originator being a suspected source or not, etc. However, it should be noted that further embodiments of the invention are not limited in this respect.

By way of example, according to some embodiments of the invention, the reference data generator 822 may be configured to record one or more of the following types of data and any combination thereof: a sequence of gain parameters corresponding to the incoming media data received as part of the real-time CMS; a sequence of packet arrival times corresponding to the incoming media data received as part of the real-time CMS; a sequence of data packet sizes corresponding to the incoming media data received as part of the real-time CMS. It should be appreciated that in accordance with some embodiments of the invention, the reference data generator 822 may be configured to collect and record data in respect of other characteristics and/or parameters corresponding to the incoming media data received as part of the real-time CMS and that such data may be obtained directly from the bit-stream (or packet stream) corresponding to the real-time CMS, or from and based upon the decoded media data.

As part of the process of generating a reference data item, the reference data generator 822 may be configured to continue collecting data in respect of a certain real-time CMS until a sufficient amount of data is collected. According to some embodiments of the invention, the reference data generator 822 may be configured to implement a reference data threshold that may be used for determining when the amount of data collected in respect of a certain real-time CMS is enough to generate a reference data item. According to one embodiment of the invention, the reference data threshold may relate to the amount of useful data collected. Usefulness of data may be associated with potential contribution of the data to a similarity evaluation process. According to some embodiments of the invention, as part of generating a reference data item, the reference data generator 822 may be configured to obtain data in respect of only specific attributes, characteristics or parameters of the real-time CMS and may disregard the rest of the real-time CMS data. This data may be used by the reference data generator 822 to create some kind of a signature of the real-time CMS. The signature may be used to generate the reference data item. However, according to still further embodiments of the invention, the reference data generator 822 may be configured to record the entire real-time CMS or the entire encoded bit-stream which corresponds to the real-time CMS as part of generating a reference data item.

According to some embodiments of the invention, if it is determined by the reference data generator 822, for example, in accordance with a reference data criteria, that the initial real-time CMS data received at the fake CMS client 820 is not sufficient for generating a reference data item in respect of the real-time CMS, the fake CMS client 820 may be configured to generate synthetic CMS data that is intended to entice or stimulate the originator 802 to provide the fake conversation client 820 with further real-time CMS data. The fake CMS client 820 may continue to generate synthetic CMS data so long as further real-time CMS data is needed for generating the reference data item. According to some embodiments of the invention, the fake CMS client 820 may include or may be associated with a media data generation module 828. According to some embodiments of the invention, the media data generation module 828 may be adapted to generate synthetic CMS data, and in particular synthetic CMS media data. The media data generation module 828 may include a set of heuristics or logic which may be utilized by the media data generation module 828 to generate the CMS media data. According to further embodiments of the invention, the media data generation module 828 may include or may be associated with a set of prerecorded CMS media data segments which may be used by the media data generation module 828 to generate the CMS media data. The media data generation module 828 may be adapted to use the recording "as is" or to modify them as necessary.

According to some embodiments of the invention, if it is determined, for example, in accordance with a reference data criterion, that the initial real-time CMS data received at the fake CMS client 820 is not sufficient for generating a reference data item in respect of the real-time CMS, the fake CMS client 820 may be configured to utilize the media data generation module 828 to provide synthetic CMS media data in response to the media data received from the originator 802 so that the originator 802 is stimulated to provide the fake CMS client 820 further CMS media data in a manner to enable the fake CMS client 820 to complete the generation of the reference data item in respect of the real-time CMS. According to some embodiments of the invention, the media data generation module 828 may be adapted to generate the media data that is to be used for responding to the originator 802 in a manner to cause the originator 802 to engage in conversation with the fake CMS client 820, without becoming suspicious of the nature of the fake CMS client 820. For example, according to some embodiments of the invention, the media data generation module 828 may be adapted to adapt or otherwise conform the media data it generates so that it complies with authentic human behaviors. For example, the media data generation module 828 may be adapted to introduce response delays into the real-time CMS in a manner which simulates authentic human behavior. The media data generation module 828 may be adapted to continue to generate CMS media data so long as additional media data (from the originator) is required for generating the reference data item.

According to some embodiments of the invention, the fake CMS client 820 may be configured to generate a reference data item in respect of each real-time CMS established with the fake CMS client 820. It would be appreciated, that the fake CMS client 820 is not an authentic CMS client, and therefore it is not likely to be a participant of a legitimate media conversation session. Accordingly any real-time CMS established with the fake CMS client 820 may be regarded a-priori as being suspicious. However, according to some embodiments of the invention, the fake CMS client 820 may be adapted to generate reference data items only in respect of some of the real-time CMSs established with the fake CMS client 820. The fake CMS client 820 may be adapted to select in respect of which session to generate a reference data item in accordance with certain rules or criteria. For example, the fake CMS client 820 may be configured to determine whether to generate a reference data item in respect of a certain real-time CMS established therewith based upon the signaling data associated with the real-time CMS and/or based upon the media data or some portion thereof corresponding to the real-time CMS. The fake CMS client 820 may be configured to use any suitable similarity evaluation technique or method for determining whether to generate a reference data item in respect of a certain real-time CMS, including but not limited to, any of the similarity evaluation processes described above with reference to some aspects of the present invention, and any combination thereof. As part of the similarity evaluation process implemented by the fake CMS client 820 various similarity thresholds and unwanted CMS detection criteria may be utilized.

According to some embodiments of the invention, the reference data item generated by the fake CMS client 820 may be used by a client 804 that is in receipt of the reference data item to detect unwanted CMS traffic. For example, as is shown in FIG. 8 and according to some embodiments of the invention, upon receiving the reference data item from the fake CMS client 820, the client 804 may be configured to store the reference data item within a reference database 814. The client 804 or a system for detecting unwanted CMS data 810 associated with the client 804 may be adapted to use the reference data item as part of a similarity evaluation process implemented by a similarity evaluation module 812 in respect of a real-time CMS. For example, according to some embodiments of the invention, the client 804 or a system for detecting unwanted CMS data 810 associated with the client 804 may be adapted to use the reference data item as part of a similarity evaluation process upon detecting real-time CMS data of which the client 804 is the intended recipient. In FIG. 8 the real-time CMS in respect of which the client 804 is configured to implement a similarity evaluation process is referenced "real-time CMS 2". As part of the similarity evaluation process, the similarity evaluation module 812 may be adapted to evaluate the similarity between real-time CMS 2 and the reference data item received from the fake CMS client 820. As part of evaluating similarity between the real-time CMS and the reference data item, the similarity evaluation module 812 may be adapted to implement one or more similarity evaluation processes. It should be appreciated that the similarity evaluation module 812 may be configured to implement any suitable similarity evaluation process including, but not limited to: the progressive similarity process, the direct-bit stream evaluation process, and the packet arrival time process, which were described above in greater detail.

According to some embodiments of the invention, the fake CMS client 820 may be further adapted to generate one or more CMS traffic control rules based upon signaling data associated with a real-time CMS established with the fake CMS client 820. Detailed discussions in respect of various embodiments of the invention related to the generation of CMS traffic control rules have been provided above and are applicable with the necessary modifications to the generation of CMS traffic control rules by the fake CMS client 820. The fake CMS client 820 may be adapted to publish the CMS traffic control rules, so that clients 804 in receipt of the CMS traffic control rules may implement them, in a manner to enable future CMS traffic control.

Although according to some embodiments of the invention, there is disclosed a system which includes a fake conversational client and additional components, further embodiments of the invention contemplate a configuration whereby the functionality of the additional components is incorporated into the fake conversational client.

Figure 9:
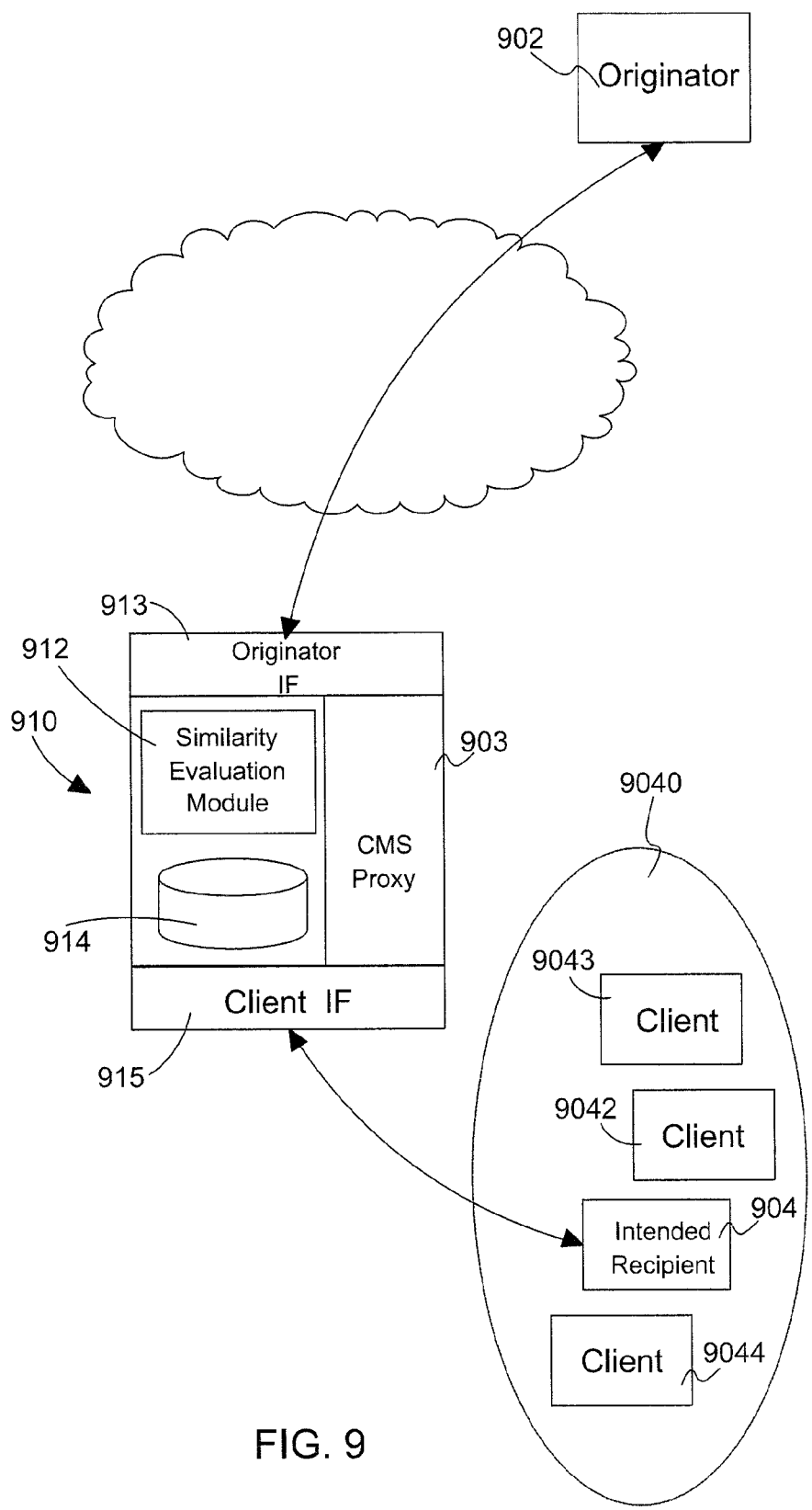
FIG. 9 is a block diagram illustration of a system for detecting unwanted CMS traffic which includes a CMS proxy, according to some embodiments of the invention.

Reference is now made to FIG. 9, which is a block diagram illustration of a system for detecting unwanted CMS traffic which includes a CMS proxy, according to some embodiments of the invention. In accordance with some embodiments of the invention, a system for enabling detection of unwanted CMS traffic 910 may be implemented as part of or may be associated with a CMS proxy 903. According to some embodiments of the invention, the CMS proxy 903 may be positioned between an originator 902 of a real-time CMS and an intended recipient 904 of the real-time CMS. According to further embodiments of the invention, the CMS proxy 903 may be associated with a plurality of nodes, for example, as is shown in FIG. 9, the CMS proxy 903 may be associated with a certain network domain 9040 which includes a plurality of nodes 904, 9042, 9043 and 9044.

According to some embodiments of the invention, the CMS proxy 903 may be adapted to receive real-time CMS traffic that is intended for of any of the nodes or clients 904, 9042, 9043 and 9044 associated with the CMS proxy 903. For example, real-time CMS traffic from an originator 902 that is intended for a client 904 associated with the CMS proxy 903 may be received at the CMS proxy 903 on its way to its destination—client 904. The CMS proxy 903 may be configured such that any network traffic whose intended recipient is one of the nodes associated with the CMS proxy 903 is required to pass through the CMS proxy 903 (this may be achieved, for example, by connecting the nodes network communication channels to the CMS proxy 903). According to further embodiments of the invention, the CMS proxy 903 may be configured such that any real-time CMS traffic whose intended recipient is one of the nodes associated with the CMS proxy 903 is required or forced to pass through the CMS proxy 903.

As mentioned above, the CMS proxy 903 may include or may be associated with a system for detecting unwanted CMS traffic 910. According to some embodiments of the invention, the CMS proxy 903 may include or may be associated with a similarity evaluation module 912 and a reference database 914. The reference database 914 may include one or more reference data items. According to some embodiments, the reference database 914 may include data in respect of previous CMSs intended to be received by any of the nodes associated with the CMS proxy 903. According to further embodiments of the invention, the reference database 914 may include reference data items received from external sources, such as for example, from a fake CMS client that the CMS proxy is a subscriber of. Each reference data item may correspond to a previous CMS or to a portion of a previous CMS. The reference data items may be used as part of the similarity evaluation process to determine whether the real-time CMS (or some portion thereof) is similar to a previous CMS. The similarity evaluation module 912 may be adapted to implement a similarity evaluation process in respect of the real-time CMS received by the CMS proxy 903. According to some embodiments of the invention, the CMS proxy 903 may utilize the similarity evaluation module 912 to implement a similarity evaluation process in respect of at least a portion of the real-time CMS data received from the originator 902 at the CMS proxy 903. According to some embodiments of the invention, the similarity evaluation process implemented by the similarity evaluation module 912 may be configured to determine whether a media portion of a real-time CMS and a reference data item associated with a previous CMS are similar enough (e.g. is above a similarity threshold(s)). Examples of various approaches to similarity evaluation were described in greater detail above. It should be appreciated that the similarity evaluation module 912 employed by the CMS proxy 903 may be configured to implement any of the similarity evaluation processes disclosed above and any combination thereof. According to further embodiments of the invention, the similarity evaluation module 912 employed by the CMS proxy 903 may be configured to implement any additional similarity evaluation process suitable for evaluating similarity between a set of values associated with a real-time CMS (or some portion thereof) and a reference data item associated with a previous CMS (or some portion thereof).

The CMS proxy 903 may be adapted to utilize a similarity evaluation module 912 to implement a similarity evaluation process. The CMS proxy 903 may cause the similarity evaluation process to be implemented as part of a process of detecting unwanted CMS traffic. According to some embodiments of the invention, the proxy 903 may be configured to determine whether the real-time CMS is unwanted based on the results of the similarity evaluation process. According to some embodiments of the invention, once the CMS proxy 903 determines that the real-time CMS is unwanted or that a certain portion of the real-time CMS is unwanted, the CMS proxy 903 may terminate or discontinue the real-time CMS or may remove an unwanted portion of the real-time CMS, thereby preventing it from reaching the intended recipient 904. The relationship between the similarity evaluation process and the process for detecting unwanted CMS traffic were discussed in detail above and it would be appreciated that these discussions may be applied mutatis mutandis to embodiments of the invention which include the system for detecting unwanted CMS traffic 910 employed by the CMS proxy 903. It should be appreciated that according to some embodiments of the invention, the CMS proxy 903 may be configured to altogether prevent unwanted real-time CMS traffic from reaching the intended recipient 904 or, in accordance with further embodiments of the invention, it may be configured to break off a CMS session with the intended recipient 904 once it is determined that the real-time CMS is unwanted. Examples in accordance with some embodiments of the invention which relate to configurations of the CMS proxy 903 which enable the CMS proxy 903 to altogether prevent unwanted real-time CMS traffic from reaching the intended recipient 904 are provided below. Further examples in accordance with further embodiments of the invention which relate to configurations of the CMS proxy 903 which enable the CMS proxy 903 to break off a CMS session with the intended recipient 904 once it is determined that the real-time CMS is unwanted are also provided below.

The initial real-time CMS data received at the CMS proxy 903 (from the originator 902) may not be sufficient or may not be appropriate for evaluating similarity between the real-time CMS and a reference data item. In this context, it would be appreciated that typically the initial real-time CMS data exchanges include CMS signaling data that is necessary for setting up a real-time CMS media data exchange. In such cases, the CMS proxy 903 may be adapted to establish a real-time CMS with the originator 902 in order to obtain sufficient real-time CMS media data so as to enable the CMS proxy 903 to implement a similarity evaluation process in respect of the real-time CMS, as part of a process of detecting unwanted real-time CMS traffic.

According to some embodiments of the invention, upon receiving from an originator 902 real-time CMS traffic intended for a node 904 associated with the CMS proxy 903, the CMS proxy 903 may be configured to setup a real-time CMS with the originator 902 of the real-time CMS. The CMS proxy 903 may be configured to use the (additional) data received from the originator 902 during the real-time CMS established therewith to evaluate the similarity of the real-time CMS media data received from the originator with a reference data item corresponding to a previous CMS. According to further embodiments of the invention, the CMS proxy 903 may be configure to enable the CMS data intended for the recipient 904 to reach the recipient 904 only through the CMS session established between the originator 902 and the CMS proxy 903, as will be described in further detail below.

According to some embodiments of the invention, the CMS proxy 903 may include or may be associated with an originator interface (IF) 913. The originator IF 913 may be configured to setup a real-time CMS between the CMS proxy 903 and the originator 902 of the CMS traffic intended from one of the nodes associated with the CMS proxy 903. According to some embodiments of the invention, upon detecting real-time CMS traffic that is intended for a node 904 associated with the CMS proxy 903, the originator IF 913 may be adapted to setup a real-time CMS between the CMS proxy 903 and the originator 902 of the real-time CMS traffic.

According to some embodiments of the invention, the CMS proxy 903 may be adapted to use data with respect to the intended recipient 904 of the real-time CMS traffic to generate signaling data that is to be used for setting up the real-time CMS between the CMS proxy 903 and the originator 902. For example, the CMS proxy 903 may be configured to use the network address of the intended recipient 904 to generate signaling data. According to still further embodiments of the invention, the CMS proxy 903 may use the signaling data correlated with the intended recipient 902 of the real-time CMS in a manner to cause the originator 902 of the real-time CMS to identify the CMS proxy 903 as the intended recipient of the real-time CMS. Thus the originator 902 of the real-time CMS may be kept unaware of the participation of the CMS proxy 903 in the real-time CMS.

According to some embodiments of the invention, once the real-time CMS between the originator 902 and the CMS proxy 903 is setup, real-time CMS media data may be exchanged between the originator 902 and the CMS proxy 903. According to some embodiments of the invention, the CMS proxy 903 may be configured to stimulate the originator 902 to provide the CMS proxy 903 with additional real-time CMS media data. It would be appreciated that according to some embodiments of the invention, a certain amount of CMS media data may be required by a similarity evaluation process implemented by a similarity evaluation module 912 for the similarity evaluation module 912 to be able to make a determination in respect of similarity. According to some embodiments of the invention, the CMS proxy 903 may be configured to respond to real-time CMS media data received from the originator 902 with appropriate real-time CMS media data, in order to stimulate the originator 902 to provide the CMS proxy 903 with additional real-time CMS media data.

According to some embodiments of the invention, the CMS proxy 903 may be configured to generate CMS media and communicate the generated CMS data to the originator 902, so as to stimulate the originator 902 to provide the CMS proxy 903 with further real-time CMS media data. The CMS proxy 903 may include a media generation module (not shown) operative for generating real-time CMS media data. The media generation module may be configured to generate real-time CMS media data responsive to CMS media data received from the originator 902 during the real-time CMS. The media generation module may include appropriate logic so as to enable the generation of appropriate real-time CMS media data. The media generation module may include prerecorded CMS media data, and may use the prerecorded media data to generate appropriate media data response. Further details in connection with one example of a media generation module were provided above with reference to the system for detecting unwanted CMS shown in FIG. 8, and are applicable with any necessary modifications. However, in accordance with further embodiments of the invention, as will be described in greater detail below, as an alternative to generating real-time CMS media data, or in addition, the CMS proxy 903 may be configured to obtain CMS media data from the intended recipient 904 of the real-time CMS traffic received at the CMS proxy 903. According to further embodiments of the invention, the CMS proxy 903 may be configured to obtain from the intended recipient 904 CMS media data that is responsive to the real-time CMS media data received from the originator 902 over the real-time CMS established between the originator 902 and the CMS proxy 903.

As mentioned above, the CMS proxy 903 may be adapted to receive real-time CMS traffic that is intended for any of the nodes or clients 904, 9042, 9043 and 9044 associated with the CMS proxy 903. In a similar way, according to some embodiments of the invention, the CMS proxy 903 may be adapted to receive outbound real-time CMS traffic from any of the nodes or clients 904, 9042, 9043 and 9044 associated with the CMS proxy 903. The CMS proxy 903 may be configured such that any outbound network traffic from the nodes associated with the CMS proxy 903 is required to pass through the CMS proxy 903. According to further embodiments of the invention, the CMS proxy 903 may be configured such that any outbound network traffic from the nodes associated with the CMS proxy 903 is forced to pass through the CMS proxy 903.

According to some embodiments of the invention, upon receiving real-time CMS traffic intended for a node 904 associated with the CMS proxy 903, the CMS proxy 903 may be configured to setup a CMS with the intended recipient 904 of the real-time CMS. According to further embodiments of the invention, the CMS proxy 903 may be configured to enable to CMS data intended for the recipient 904 to reach the recipient only through the CMS session established between the CMS proxy 903 and the intended recipient 904, as will be described in further detail below.

According to some embodiments of the invention, the CMS proxy 903 may include or may be associated with a client interface (IF) 915. The client IF 915 may be configured to setup the CMS with the nodes associated with the CMS proxy 903. According to some embodiments of the invention, upon receiving real-time CMS traffic that is intended for a node 904 associated with the CMS proxy 903, the client IF 915 may be adapted to setup a CMS between the CMS proxy 903 and the intended recipient 904 of the real-time CMS. According to some embodiments of the invention, the CMS proxy 903 may be adapted to use certain signaling data received from the originator 902 of the real-time CMS to generate the signaling data that is to be used for setting up the CMS between the CMS proxy 903 and the intended recipient 904 of the real-time CMS. According to still further embodiments of the invention, the CMS proxy 903 may use the signaling data received from the originator 902 of the real-time CMS in a manner to cause the intended recipient 904 of the real-time CMS to identify the originator of the CMS with the CMS proxy 903 as being the originator 902 of the real-time CMS intercepted by the CMS proxy 903.

According to some embodiments of the invention, the CMS proxy 903 may be configured to maintain the real-time CMS with the originator 902 at least so long as there is a need for additional CMS data (and in particular for CMS media data) for evaluating similarity between the real-time CMS and a reference data item correlated with a previous CMS and/or for determining whether the real-time CMS is unwanted.

It should be appreciated that according to some embodiments of the invention, by establishing back-to-back sessions through the CMS proxy 903 with the originator 902 on the one hand and the intended recipient 904 on the other, in a manner whereby the CMS proxy 903 is transparent to the either participants (the originator 902 being under the impression that it is communicating with the intended recipient 904 and the intended recipient 904 being under the impression that it is communicating with the originator 902), the CMS proxy 903 may be able to create an indirect communication link through the CMS proxy 903 which is substantially equivalent in some respect to a real-time CMS between the originator 902 and the intended recipient 904. It would be further appreciated that the above disclosed communication scheme supported and enabled by the CMS proxy 903 allows the CMS proxy 903 to overcome potential encryption of the real-time CMS traffic due to the fact that the real-time CMS is terminated at the CMS proxy 903.

Furthermore, as mentioned above, according to some embodiments of the invention, the CMS proxy 903 may be associated with and provide service to a plurality of nodes. Thus the resources required for detecting and handling unwanted CMS traffic may be centralized. It would be appreciated that a centralized CMS traffic control solution may be more efficient and potentially less costly. Furthermore, a centralized solution may allow for a more comprehensive reference database, since it may be more simply updated with data relating to CMS traffic whose intended recipient is any of the nodes associated with the CMS proxy.

According to some embodiments of the invention, either in addition to the similarity evaluation approach towards detecting unwanted CMS traffic, or as an alternative, the CMS proxy 903 may be configured to implement CMS traffic control rules associated with CMS signaling data to detect unwanted CMS traffic. For example, according to some embodiments of the invention, the CMS proxy 903 may be adapted to implement a certain CMS control rule in accordance with which any real-time CMS traffic whose signaling data is equal to or otherwise associated with certain signaling data prescribed by the CMS traffic control rule is unwanted. In accordance with another example, the CMS proxy 903 may be adapted to implement a certain CMS control rule in accordance with which any real-time CMS traffic whose signaling data is equal to or otherwise associated with certain signaling data prescribed by the CMS traffic control rule is suspected of being unwanted. According to some embodiments of the invention, upon determining that a certain real-time CMS is suspected of being unwanted, the CMS proxy 903 may be configured to adjust a similarity evaluation process that is to be implemented in respect of the real-time CMS. According to further embodiments of the invention, as part of adjusting a similarity evaluation process, the CMS proxy 903 may be configured to adjust one or more of the following: one or more similarity thresholds implemented by the similarity evaluation process; the amount of data required to establish similarity (or lack thereof), and/or any other parameter associated with the similarity evaluation process.

The invention was described with reference to various aspects thereof. It would be appreciated that while some embodiments of the invention are applicable to only one or to only some aspects of the invention, may other embodiments of the invention are application to further aspects of the invention. Furthermore, some embodiments of the invention have been described with reference to a particular aspect or aspects and for reasons and convenience and/or clarity may not have been explicitly replicated as part of the description of further aspects of the invention. In this regard, the application should be considered as a whole, and various embodiments of the invention described with reference to a specific aspect or aspects may also be applicable, in accordance with further embodiments of the invention to a further aspect of the invention, despite not being specifically disclosed with respect to that aspect, unless it is apparent to a person with ordinary skill in the art that such ascription is under relevant circumstances inappropriate.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A method of detecting unwanted conversational media sessions, said method comprising:
   providing a conversation proxy positioned between an originator of a real-time CMS and a client that is the intended recipient of the real-time CMS, in a manner to cause the originator of the real-time CMS to setup the real-time CMS intended for the client through the proxy;
   evaluating similarity between media data of the real-time CMS and a reference data item associated with a previous CMS; and controlling the real-time CMS based upon a result of said evaluating.

2. The method according to claim 1, wherein said controlling comprises executing an action with respect to the real-time CMS in case it is determined that the similarity between the real-time CMS's media data and the reference data is in compliance with a similarity criterion, wherein the action is selected from a group consisting of:
   continue said evaluating similarity between the real-time CMS's media data and reference data based upon at a later instant during a progress of the a real-time CMS and based upon a larger amount of real-time CMS media data available at the later instant;
   remove certain media data from the real-time CMS prior to forwarding the corresponding CMS data to the client or to the originator; and
   discontinue the real-time CMS.

3. The method according to claim 1, wherein said evaluating comprises evaluating similarity between the real-time CMS's media data and the reference data in accordance with one or more of the following:
   similarity between at least a portion of the real-time CMS and the reference data item;
   progressive similarity between the real-time CMS and the reference data item;
   similarity between a sequence of significant attributes obtained directly from a bit-stream corresponding to the real-time CMS and reference data item corresponding to a sequence of significant attributes of a bit-stream associated with a previous CMS;
   similarity between packet arrival statistics associated with the real-time CMS and reference data item corresponding to packet arrival statistics associated with a previous CMS.

4. The method according to claim 1, wherein said proxy is associated with a plurality of clients, and wherein the reference data is generated based upon one or more previous real-time CMS's whose intended recipient was any of the plurality of clients associated with the proxy.

5. The method according to claim 1, further comprising creating a CMS traffic control rule based upon signaling data associated with the real-time CMS in case it is determined that the similarity between the real-time CMS and reference data item is in compliance with a similarity criterion.

6. The method according to claim 5, further comprising implementing the CMS traffic control rules in respect of future CMS traffic, wherein said implementing comprises controlling future real-time CMS traffic whose intended recipient is a client associated with the proxy in accordance with the CMS traffic control rule.

7. The method according to claim 5, wherein said signaling data includes one or more of the following signaling data:
   an originator's network address;
   an originator's network domain;
   a subject description.

8. The method according to claim 1, further comprising interfacing the real-time CMS data arriving from the originator and the real-time CMS data arriving from the client through the proxy to enable setting up of the of the real-time CMS between the originator and the client through the conversation proxy.

9. The method according to claim 8, further comprising establishing a first real-time CMS between the originator of the real-time CMS and the conversation proxy using signaling data associated with the intended client, and establishing a second real-time CMS between the conversation proxy and the client using signaling data associated with the originator, thereby enabling CMS data exchanges between the originator and the client through the proxy.

10. The method according to claim 9, wherein said establishing the real-time CMS between the originator and the conversation proxy and said establishing the real-time CMS between the conversation proxy and the client is performed in a manner to render the proxy transparent to the originator and to the recipient.

11. A system for detecting unwanted conversational media sessions, said system comprising:
   a conversation proxy positioned between an originator of a real-time CMS and a client that is an intended recipient of the real-time CMS, said conversation proxy being adapted to cause the originator of the real-time CMS to setup the real-time CMS intended for the client through the proxy; a processor and
   a similarity evaluation module adapted to utilized the processor to implement a similarity evaluation process to evaluate similarity between media data of the real-time CMS and a reference data item associated with a previous CMS,
   wherein said conversation proxy is adapted to control the real-time CMS based upon data results of the similarity evaluation process.

12. The system according to claim 11, further comprising a reference database, said reference database including a plurality of reference data items, wherein each reference data item includes at least data in respect of media data corresponding to a previous CMS.

13. The system according to claim 11, wherein said conversation proxy comprises:
   an originator interface adapted to establish a first real-time CMS between the originator of the real-time CMS and the conversation proxy using signaling data associated with the intended client; and
   a client interface adapted to establish a second real-time CMS between the conversation proxy and the client using signaling data associated with the originator,
   wherein said originator interface and said client interface are configured to operate in a manner to enable CMS data exchanges between the originator and the client through the proxy.

* * * * *